US008547560B2

(12) United States Patent
Sato et al.

(10) Patent No.: US 8,547,560 B2
(45) Date of Patent: Oct. 1, 2013

(54) SHEET PROCESSING APPARATUS AND IMAGE FORMING APPARATUS

(75) Inventors: Koki Sato, Tsukubamirai (JP); Satoshi Iwama, Minami-alps (JP)

(73) Assignee: Canon Finetech Inc., Misato-shi (JP)

(*) Notice: Subject to any disclaimer, the term of this patent is extended or adjusted under 35 U.S.C. 154(b) by 400 days.

(21) Appl. No.: 12/873,176

(22) Filed: Aug. 31, 2010

(65) Prior Publication Data

US 2010/0320671 A1 Dec. 23, 2010

(30) Foreign Application Priority Data

Sep. 11, 2009 (JP) ................................ 2009-211125
Jul. 16, 2010 (JP) ................................ 2010-161370

(51) Int. Cl.

| | |
|---|---|
| ***G06K 15/00*** | (2006.01) |
| ***H04N 1/403*** | (2006.01) |
| ***H04N 1/21*** | (2006.01) |
| ***H04N 1/23*** | (2006.01) |
| *B65H 33/04* | (2006.01) |
| *B65H 39/00* | (2006.01) |
| *B41L 43/00* | (2006.01) |
| *B41L 43/12* | (2006.01) |

(52) U.S. Cl.
USPC ......... 358/1.12; 358/3.32; 358/414; 358/296; 270/58.08; 270/32; 270/37

(58) Field of Classification Search
None
See application file for complete search history.

(56) References Cited

U.S. PATENT DOCUMENTS

| | | | | |
|---|---|---|---|---|
| 5,382,011 | A * | 1/1995 | Tani | 270/37 |
| 5,778,300 | A * | 7/1998 | Murakami et al. | 399/403 |
| 6,819,906 | B1 * | 11/2004 | Herrmann et al. | 399/368 |
| 7,134,659 | B2 | 11/2006 | Sato et al. | |
| 7,429,037 | B2 | 9/2008 | Kawata et al. | |
| 7,747,212 | B2 | 6/2010 | Yamamoto | |
| 7,748,704 | B2 | 7/2010 | Terao et al. | |
| 8,070,407 | B2 | 12/2011 | Sasamoto | |
| 8,191,884 | B2 * | 6/2012 | Sato et al. | 270/58.08 |
| 2006/0017218 | A1 | 1/2006 | Kawata et al. | |
| 2007/0057443 | A1 | 3/2007 | Terao et al. | |

(Continued)

FOREIGN PATENT DOCUMENTS

| | | |
|---|---|---|
| CN | 1724325 A | 1/2006 |
| CN | 1932665 A | 3/2007 |

(Continued)

OTHER PUBLICATIONS

Koki Sato Satoshi Iwama, U.S. Appl. No. 12/873,164, filed Aug. 31, 2010.

(Continued)

*Primary Examiner* — Satwant Singh

(74) *Attorney, Agent, or Firm* — Fitzpatrick, Cella, Harper & Scinto

(57) ABSTRACT

A sheet processing apparatus includes a gripper unit which is moved to a retreat region along long grooves in advance when moving a stapler unit to any one of first and second binding positions. The stapler unit is moved to the binding position by being guided by a guide rail portion while passing above the long grooves. Therefore, moving operations of both of the gripper unit and the stapler unit can be smoothly performed under a state in which movement of both thereof is not prohibited by the long grooves and the guide rail portion. Further, an image forming apparatus including the sheet processing apparatus is provided.

3 Claims, 22 Drawing Sheets

(56) References Cited

U.S. PATENT DOCUMENTS

| | | | | |
|---|---|---|---|---|
| 2007/0237559 | A1 | 10/2007 | Sasamoto | |
| 2008/0187383 | A1 | 8/2008 | Yamamoto | |
| 2009/0189327 | A1* | 7/2009 | Sato et al. | 270/58.08 |

FOREIGN PATENT DOCUMENTS

| | | | |
|---|---|---|---|
| CN | 101049777 | A | 10/2007 |
| CN | 101234713 | A | 8/2008 |
| CN | 101492134 | A | 7/2009 |
| JP | 20-89772 | A | 3/1990 |
| JP | 2005-132609 | A | 5/2005 |
| JP | 2005-132635 | A | 5/2005 |
| JP | 2009-173402 | A | 8/2009 |

OTHER PUBLICATIONS

Office Action dated Sep. 27, 2011, in Japanese Patent Application No. 2010-161370.

Office Action dated Nov. 13, 2012, in Chinese Patent Application No. 201010284366.8.

* cited by examiner

SHEET PROCESSING APPARATUS AND IMAGE FORMING APPARATUS

BACKGROUND OF THE INVENTION

1. Field of the Invention

The present invention relates to a sheet processing apparatus that binds sheets delivered from an image forming apparatus such as a copier or a printer, and to the image forming apparatus including the sheet processing apparatus.

2. Description of the Related Art

As a related art of the present invention, a sheet processing apparatus (hereinafter, also referred to as "processing apparatus") is known, which binds sheets subjected to image formation in an image forming apparatus. The processing apparatus includes: a processing tray that accumulates thereon the sheets to be bound; a binding device (stapler) that binds a sheet bundle on the processing tray; and a storing tray to which the sheet bundle bound on the processing tray is delivered.

In a type of the processing apparatus, there are provided a mode of binding end portions on one end side of the sheets, and a mode of binding end portions on another end side of the sheets (refer to Japanese Patent Application Laid-Open No. 2005-132635). In this apparatus, on the processing tray, tip ends of the sheets are aligned by being thrust against a stopper (reference fence), the stopper is retreated by being rotationally moved downward after the tip ends are aligned, and the binding device is moved to designated binding end portions along aligned edge portions of the sheets.

As transport means for moving, to a binding position, the sheet bundle accumulated on the processing tray, a transport method is known, in which one side of a sheet bundle is gripped by a gripping device, and this gripping device is moved, to thereby transport the sheet bundle (refer to Japanese Patent Application Laid-Open No. 02-89772). This grip/transport method is excellent in that a deviation amount of the sheet bundle is small as compared with a method in which the sheet bundle is transported to the binding position by being pushed by a pushing member. Further, a transport method is known, in which one side of the sheet bundle is gripped by a gripping device, and this gripping device is moved, to thereby transport the sheet bundle to a storing tray (refer to Japanese Patent Application Laid-Open No. 2005-132609).

SUMMARY OF THE INVENTION

In the technologies described in Japanese Patent Application Laid-Open Nos. H02-89772 and 2005-132609, on the one side gripped by the gripping device, the gripping device is located. Even if the binding device tries to move to an opposite side of the gripping device along the one side and to thereby bind the sheets, the binding device has been prohibited from moving by the gripping device, and has not been able to bind the sheets on the opposite side.

The present invention provides a sheet processing apparatus in which, even if the gripping device that grips one side of the sheet bundle to be bound is provided, the binding device can move to the opposite side of the gripping device along one side of each of the sheets and can bind the sheets, and provides an image forming apparatus including the sheet processing apparatus.

According to the present invention, a sheet processing apparatus includes: a processing tray on which sheets transported in a predetermined delivery direction are accumulated; a binding device configured to bind one side on an upstream side in the delivery direction of the sheets accumulated on the processing tray; a gripping device configured to grip the one side of the sheets bound by the binding device; a first moving mechanism configured to move the binding device in a width direction intersecting the delivery direction along the one side of the sheets accumulated on the processing tray; and a second moving mechanism configured to move the sheets in the delivery direction by moving the gripping device in the delivery direction at a time of delivering the sheets, in which, when the binding device is moved by the first moving mechanism to an opposite side of the gripping device in a direction along the one side, the second moving mechanism moves the gripping device to a retreat position at which the gripping device is prevented from prohibiting movement of the binding device, the retreat position being located downstream in the delivery direction with respect to a gripping position at which the gripping device grips the sheets still unbound by the binding device.

According to the present invention, when the binding device is moved to the opposite side of the gripping device, the gripping device is moved to the retreat position at which the gripping device is prevented from prohibiting the movement of the binding device. Here, the retreat position is located downstream in the delivery direction with respect to the gripping position at which the gripping device grips the sheets still unbound by the gripping device. In such a way, in the sheet processing apparatus of the present invention and an image forming apparatus including the sheet processing apparatus, even if the gripping device that grips one side of the sheet bundle to be bound is provided, the binding device can be moved to the opposite side of the gripping device along the one side of each of the sheets, and can perform the binding process there.

Further features of the present invention will become apparent from the following description of exemplary embodiments with reference to the attached drawings.

DESCRIPTION OF THE EMBODIMENT

Figure 1:
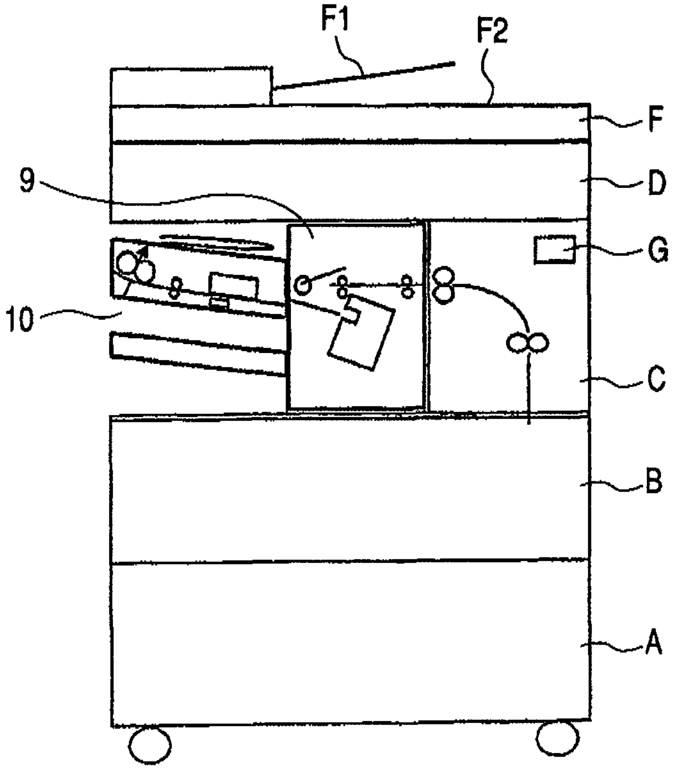
FIG. 1 illustrates a schematic configuration of an image forming apparatus including a sheet processing apparatus according to an embodiment of the present invention.

A description is made below in detail of an embodiment of the present invention with reference to the drawings. FIG. 1 illustrates a schematic configuration of an image forming apparatus including a sheet processing apparatus according to the embodiment of the present invention. In FIG. 1, a sheet feeding apparatus A, an image forming apparatus main body B, a sheet processing apparatus C, an original reading apparatus D, and an original transporting apparatus F are illustrated.

The original transporting apparatus F transports originals, which are set on an original tray F1, one by one to a platen (not shown) provided on an upper surface of the original reading apparatus D, and delivers the originals onto a delivery tray F2. The image reading apparatus D reads the originals, which pass on the platen by the original transporting apparatus F, by reading means including a lamp, multiple mirrors, a lens, and an image sensor, which are not shown. The image forming apparatus main body B includes: an exposure unit (not shown) that outputs a laser beam in response to an image signal read by the image reading apparatus D; and a photosensitive drum on a surface of which an electrostatic latent image is formed by being irradiated with the laser beam. Further, the image forming apparatus main body B includes: a developing unit that develops the electrostatic latent image formed on the photosensitive drum and forms a toner image; a transferring unit that transfers, to sheets, the toner image formed on the photosensitive drum; and a fixing unit that fixes the toner image transferred to the sheets. The exposure unit, the photosensitive drum, the developing unit and the fixing unit constitute an image forming section that forms the image on the sheets.

The sheet feeding apparatus A includes multiple cassettes (not shown), and transports the sheets contained in any one of the cassettes to the transferring unit. The sheet processing apparatus C is arranged between the image forming apparatus main body B and the original reading apparatus D. On one end side of the sheet processing apparatus C in a horizontal direction, a processing section 9 that includes a binding device is provided, and on the other end side thereof, a storing section 10 that stores the processed sheets is provided. The storing section 10 is located in a space between the image forming apparatus main body B and the original reading apparatus D. The image forming apparatus of this embodiment has a so-called in-body delivery function to deliver and store the processed sheets into the space between the image forming apparatus main body B and the original reading apparatus D.

In the image forming apparatus thus configured, at the time when each of original images is read by the original reading apparatus D and the read image is formed on the sheets, each of the originals is first caused to pass on the platen by the original transporting apparatus F. At this time, the image reading apparatus D irradiates light from the lamp, reflects the irradiated light on a surface of the original, and guides the reflected light through the multiple mirrors and the lens to an image sensor, to thereby read the image. After that, image data of the original read by the image sensor is subjected to predetermined image processing, and is transferred to the exposure unit of the image forming apparatus main body B.

Next, in the image forming apparatus main body B, the exposure unit outputs the laser beam corresponding to the image signal. This laser beam is irradiated onto the photosensitive drum while being scanned by a polygon mirror. As a result, the electrostatic latent image corresponding to the scanned laser beam is formed on the photosensitive drum. After that, the electrostatic latent image formed on the photosensitive drum is developed by the developing unit, and is visualized as the toner image.

The sheets on which the image is to be formed are transported to the transferring unit from any cassette of the sheet feeding apparatus A including the multiple cassettes. The visualized toner image formed on the photosensitive drum is transferred to the sheets in the transferring unit. The sheets to which the toner image is transferred are subjected to fixing process in the fixing unit, to thereby fix the toner image. Next, the sheets which have passed through the fixing unit are transported to the sheet processing apparatus C. After that, the sheets are subjected to a process such as binding and folding by the processing section 9, and are then delivered to the storing section 10.

Figure 2:
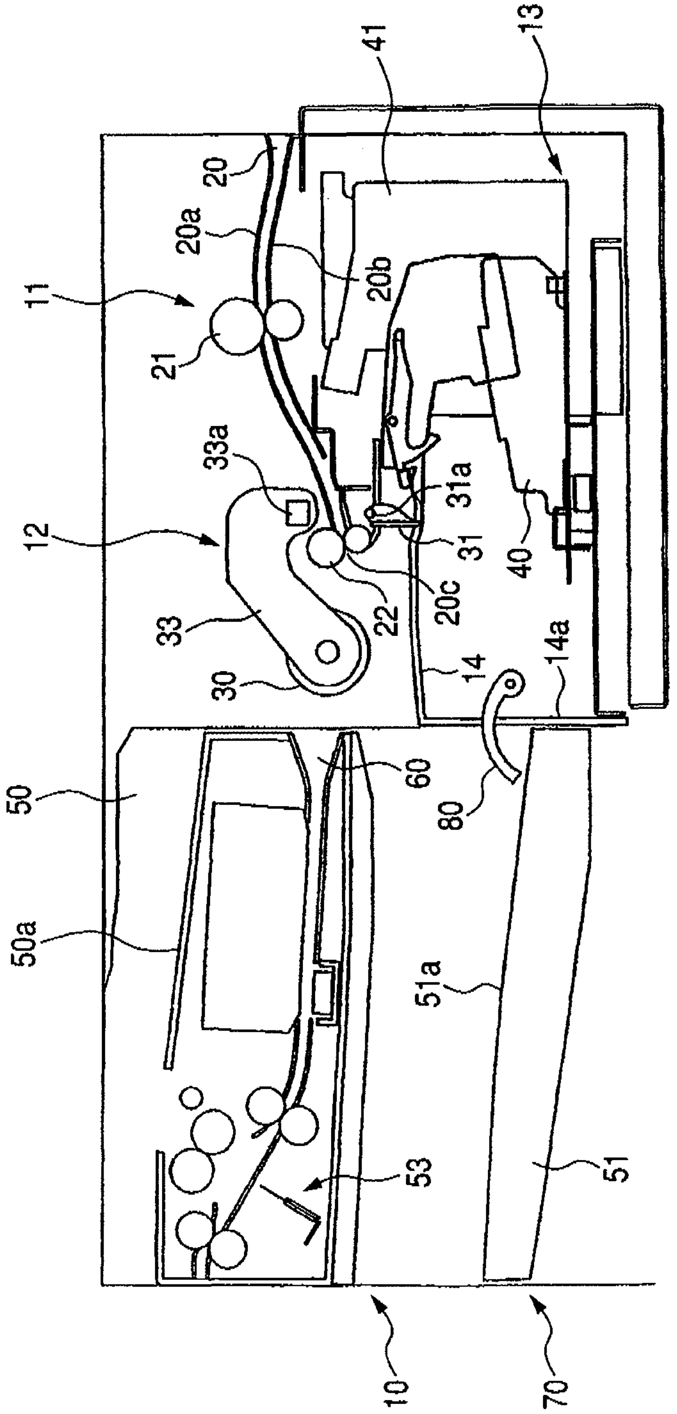
FIG. 2 is a cross-sectional view illustrating a configuration of the sheet processing apparatus.

FIG. 2 is a cross-sectional view illustrating a configuration of the sheet processing apparatus C. As illustrated in FIG. 2, the sheet processing apparatus C includes: the storing section 10; a transporting section 11 that receives and transports the sheets coming from the image forming apparatus main body B; a processing tray 14 that processes the sheets transported by the transporting section 11; and an alignment section 12 that aligns the sheets placed on the processing tray. Further, the sheet processing apparatus C includes a staple/gripper section 13 that implements a staple process (binding process) for the sheets aligned by the alignment section 12. On the processing tray 14, the sheets transported in a predetermined delivery direction are accumulated.

The transporting section 11 includes: a transporting path 20 that includes a pair of guide plates 20*a* and 20*b* guiding the sheets, and is continuous with a delivery port of the image forming apparatus main body B; and a transport roller pair 21 that transports the sheets along the transporting path 20. At a delivery port 20*c* of the transporting path 20, a delivery roller pair 22 is provided. The delivery roller pair 22 sequentially delivers the sheets to the processing tray 14 arranged below the transporting path 20. In this embodiment, when the sheets are delivered by the delivery roller pair 22, the sheets are placed in a state of being traversed between the processing tray 14, and placing surfaces of a first stack tray 50 and a second stack tray 51 provided in the storing section 10, and are then subjected to a predetermined process.

The first stack tray 50 and the second stack tray 51 have sheet placing surfaces 50*a* and 51*a*, respectively, and are supported on a frame 14*a* attached to the processing tray 14 so as to be freely ascendable and descendable in up and down directions. A saddle unit 53 is provided below the sheet placing surface 50*a* of the first stack tray 50. The sheet bundle accumulated on the processing tray 14 is selectively folded by the saddle unit 53, and is stored on the sheet placing surface 50*a* of the first stack tray 50.

On the first stack tray 50, there are stored: a folded sheet bundle coming from the saddle unit 53; and a sheet bundle subjected to end binding or two-spot binding by a stapler unit 41 as a binding device. On the sheet placing surface 51*a* of the second stack tray 51, the sheet bundle subjected to the end binding or the two-spot binding by the stapler unit 41 is mainly stored. The first stack tray 50 and the second stack tray 51 can also store a sheet bundle that is not bound or folded.

The alignment section 12 includes: a stopper member 31 that aligns one end of each of the sheets delivered onto the processing tray 14; and a shift roller 30 that comes into contact with an upper surface of the sheet delivered onto the processing tray, and transports the sheet in a width direction intersecting a sheet delivery direction of the delivery roller pair 22. The alignment section 12 includes alignment members 32 (32*a*, 32*b*) illustrated in FIG. 3, against which widthwise end portions of the sheet transported in the width direction by the shift roller 30 abut.

As illustrated in FIG. 2, the stopper member 31 is structured so as to be pivotally movable about a support shaft 31*a* taken as a fulcrum. The stopper member 31 pivotally moves to an alignment position of being perpendicular to the processing tray 14 that abuts against a trailing end (upstream end in a sheet delivery direction) of the sheet and regulates a position of the trailing end of the sheet, and pivotally moves to a retreat position of being substantially horizontal to the processing tray 14. The shift roller 30 rotates by a feed motor (not shown) capable of rotating positively and reversely, and is rotatably supported on one end side of an arm member 33 provided so as to be pivotally movable in the up and down directions about, as a fulcrum, a support shaft 33*a* in which a cross section is formed into a polygon. The shift roller 30 moves to a contact position of coming into contact with the upper surface of the sheet on the processing tray by such a pivotal movement operation of the arm member 33, and moves to a retreat position of retreating from the upper surface of the sheet. The arm member 33 is structured so as to be freely movable in the width direction along the support shaft 33*a*. The shift roller 30 slidingly moves by movement of the arm member 33.

In the alignment section 12, when the sheet is delivered onto the processing tray 14, first, the arm member 33 pivotally moves downward. When the arm member 33 pivotally moves downward, the shift roller 30 moves from the retreat position to the contact position, and then rotates, to thereby transport the sheet in a direction reverse to the sheet delivery direction, that is, in a direction toward the stopper member 31. By the rotation of the shift roller 30, the sheet is thrust against the stopper member 31 located at the alignment position. An end portion of the sheet in a feeding direction, that is, the trailing end thereof is aligned by the stopper member 31.

When the trailing end of the sheet is aligned, the shift roller 30 is stopped. After that, the arm member 33 moves in the width direction by a shift motor (not shown), and thus the shift roller 30 slidingly moves to the alignment member 32 side in a contact state with the upper surface of the sheet. The shift roller 30 is formed of a high friction member such as urethane rubber. When the shift roller 30 slidingly moves, the sheet also slides to the alignment member 32 side following the slide movement. After that, the arm member 33 (shift roller 30) slidingly moves until one widthwise end of the sheet abuts against the alignment member 32, and is then stopped. In such a way, the widthwise end portions of the sheet are aligned.

The sheet processing apparatus C of this embodiment includes, as binding modes, a first end binding mode of binding the one end side of each of the sheets in the width direction, a second end binding mode of binding the other end side opposite to the one end side, and a two-spot binding mode of binding two spots of one side of the sheet. At the time of the first end binding mode or the two-spot binding mode, the shift roller 30 thrusts the sheet against the alignment member 32*a* illustrated in FIG. 3 and provided on a depth side, to thereby align the width direction of the sheet. The depth side refers to a region deeper than a widthwise center of each sheet transported to the sheet processing apparatus C when viewed from front of the sheet processing apparatus C. Here, it is defined that the sheet processing apparatus C illustrated in FIG. 1 shows the front thereof, and the width direction is the same as the direction intersecting the sheet delivery direction. The image forming apparatus main body B transports the sheet to the sheet processing apparatus C while taking the center as a reference. At the time of the second end binding mode, the shift roller 30 thrusts the sheet against the alignment member 32*b* provided on a front side, to thereby align the width direction of the sheet.

When alignment operations for the trailing end and one widthwise end of the sheet are ended, the arm member 33 pivotally moves upward. The shift roller 30 moves to the retreat position apart from the upper surface of the sheet. After that, the arm member 33 and the shift roller 30 move along the support shaft 33*a* to an initial position (home position) located at a substantial widthwise center of the processing tray 14. Then, when the next sheet is delivered onto the processing tray 14, the arm member 33 and the shift roller 30 execute similar alignment operations.

As illustrated in FIG. 2, the staple/gripper section 13 includes a gripper unit 40 as a gripping device that grips and moves the sheet bundle aligned on the processing tray. The gripper unit 40 can grip one side of the sheet and move in the sheet delivery direction intersecting the one side. Then, the gripper unit 40 moves the sheet to a position at which the binding process by the stapler unit 41 can be implemented. The staple/gripper section 13 includes the stapler unit 41 that binds the sheet bundle moved to such a staple process position (binding position) by the gripper unit 40. The stapler unit 41 constitutes a binding device that can individually implement the binding process at first and second binding positions on both end portions of one side of the sheet on the processing tray 14. The gripper unit 40 is movable in the arrow c and d directions of FIG. 3 (sheet delivery direction and reverse direction to sheet delivery direction). The gripper unit 40 moves to a delivery position indicated by P3 at the time of delivering the sheet bundle, moves to a grip position indicated by P1 at the time of gripping a trailing end portion of the sheet bundle, and moves to the staple process position indicated by GHP at the time of stapling the sheet bundle.

At the time of binding two spots of the sheet bundle, the gripper unit 40 moves to a unit connection position P2 at which the gripper unit 40 is to be connected to the stapler unit 41. In this embodiment, the staple process position GHP by the gripper unit 40 and a home position of the gripper unit 40 become the same. The delivery position P3 to which the gripper unit 40 moves and a rail connection position to be described later, at which rails are connected to each other by the movement of the gripper unit 40, become the same. Specifically, a configuration is adopted so that the delivery position (rail connection position) P3 can be the same as a retreat region (region indicated by a chain double-dashed line of FIG. 9) at which the gripper unit 40 moves and retreats prior to the movement of the stapler unit 41. Hereinafter, for the sake of convenience, the staple process position and the home position, and the delivery position P3 and the rail connection position are used in accordance with objects, and functional operations. The position of the gripper unit 40 of FIG. 3 is indicated by GHP.

The gripper unit 40 is at least movable to the grip position (gripping position) P1 at which a sheet bundle S transported onto the processing tray 14 is gripped. A control unit G moves the gripper unit 40 to the delivery position P3 before a first sheet of the sheet bundle to be stacked is transported to the processing tray 14. The control unit G controls the gripper unit 40 to move to the grip position P1 after moving the stapler unit 41 to the first or second binding position.

Figure 3:
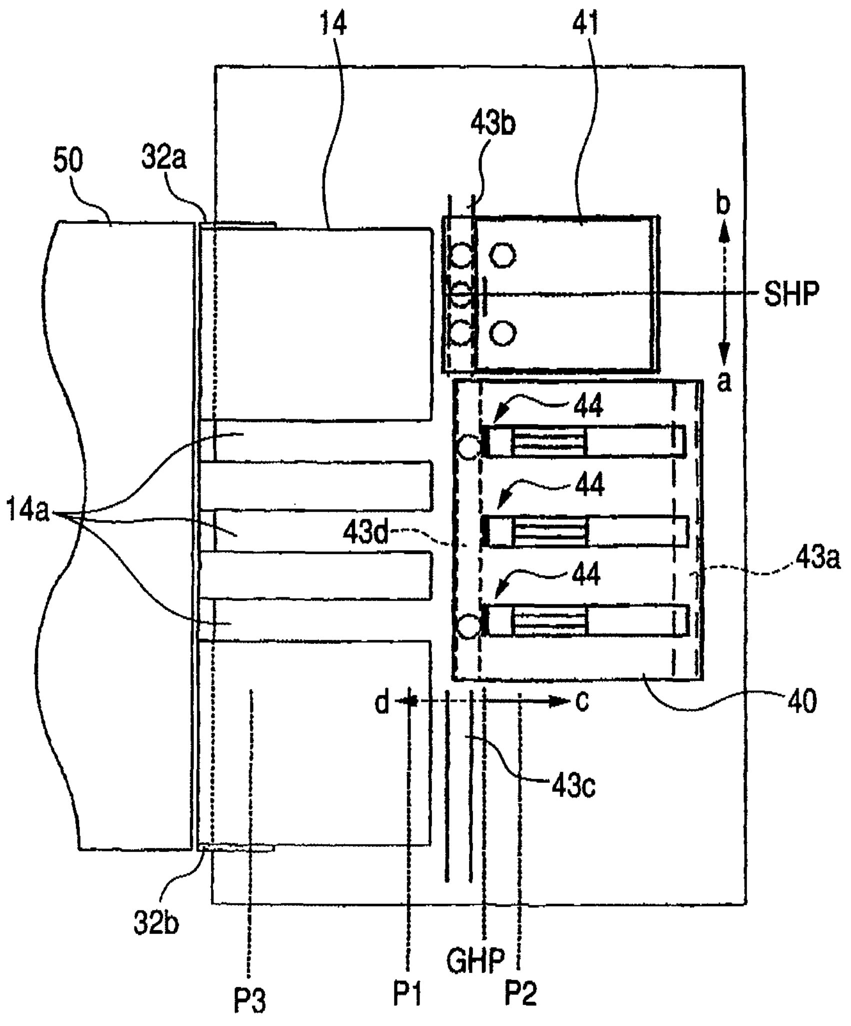
FIG. 3 is a plan view illustrating the sheet processing apparatus.

The stapler unit 41 is movable in the arrow a and b directions (width direction) of FIG. 3, and moves to a home position thereof and a staple position to be determined in response to each of the binding modes and a sheet size. SHP of FIG. 3 indicates a staple portion (centerline) of the stapler unit 41.

Figure 4:
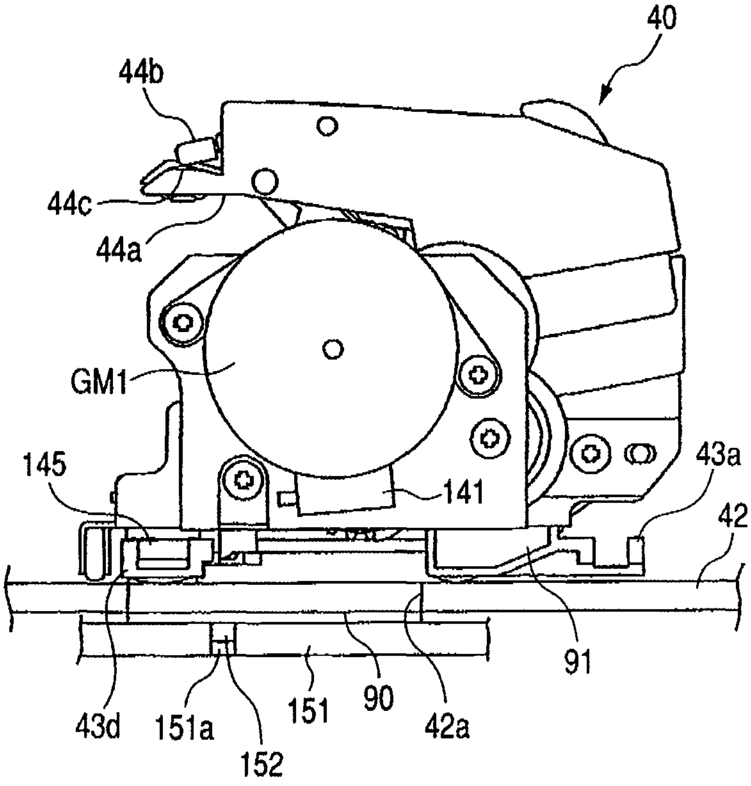
FIG. 4 is a side view illustrating an exterior appearance of a gripper unit provided in a gripper/staple section of the sheet processing apparatus.
Figure 5A:
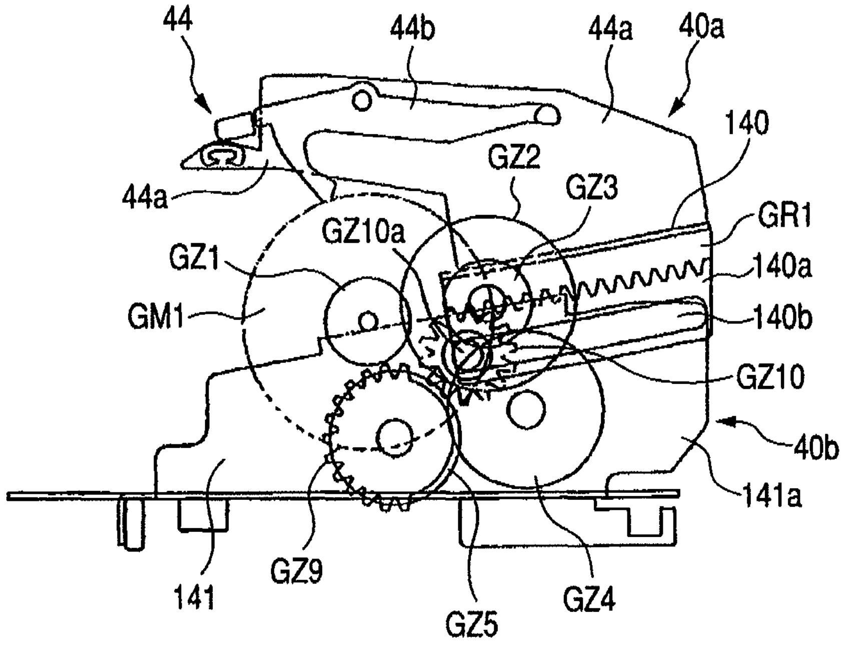
FIGS. 5A and 5B are first views illustrating a configuration of the gripper unit.
Figure 5B:
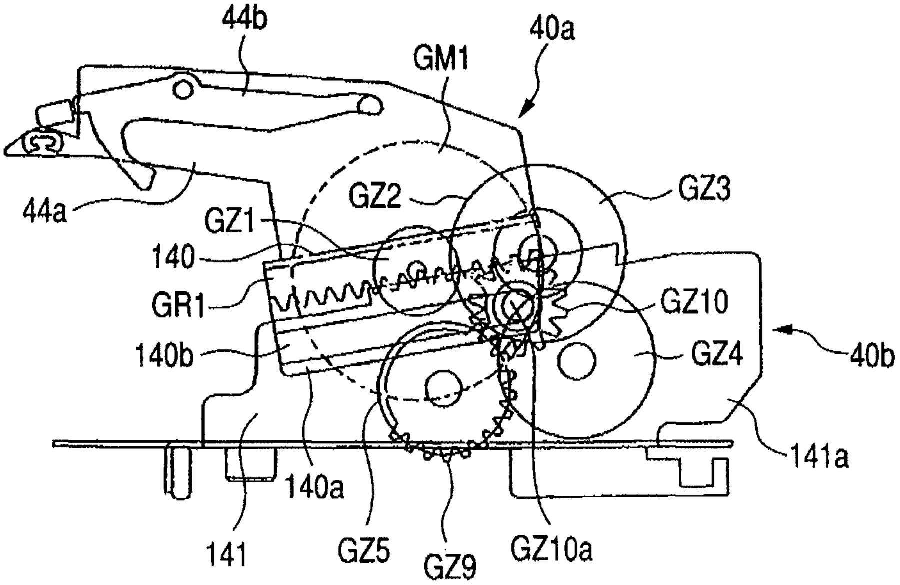

FIG. 4 is a side view illustrating an exterior appearance of the gripper unit 40. The gripper unit 40 includes a first gripper unit 40*a* including a grip arm pair 44 that grips the sheet bundle aligned on the processing tray 14 as illustrated in FIGS. 5A and 5B. A second gripper unit 40*b* provided in the gripper unit 40 includes a drive mechanism that supports the first gripper unit 40*a* so as to allow the first gripper unit 40*a* to slide in parallel to the sheet delivery direction and grips the sheet bundle by the grip arm pair 44.

Figure 6A:
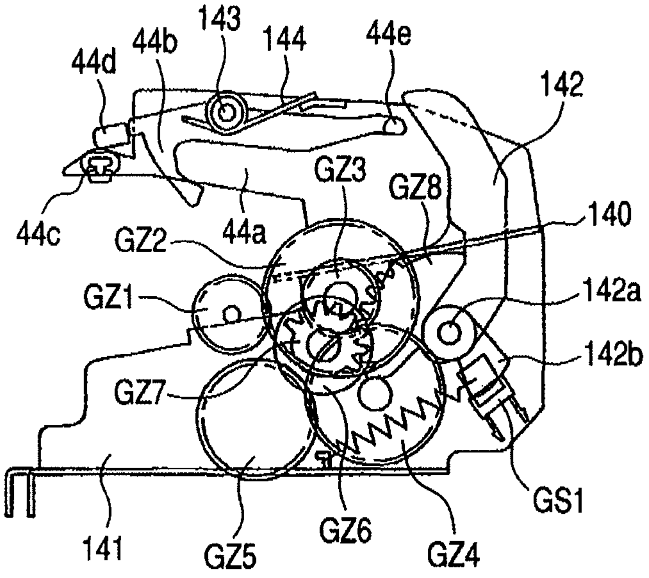
FIGS. 6A and 6B are second views illustrating the configuration of the gripper unit.
Figure 6B:
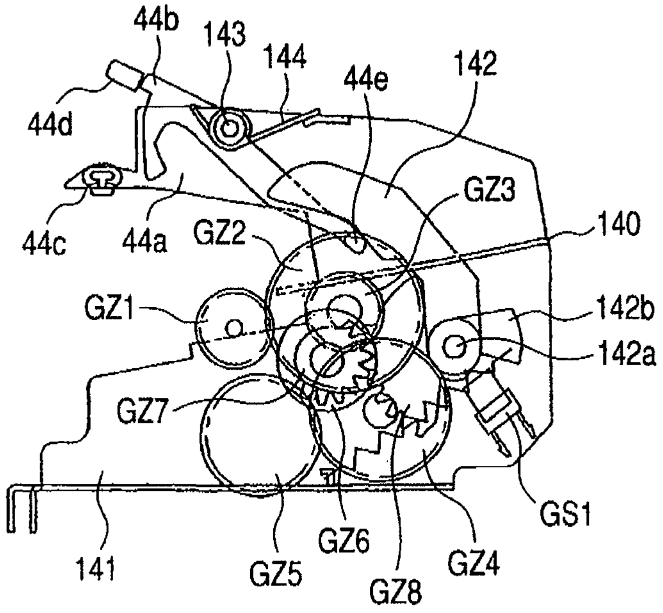

The first gripper unit 40*a* includes the grip arm pair 44 including: a fixed grip arm 44*a* that supports a lower surface of the sheet bundle; and a movable grip arm 44*b* that is provided near an upper portion of the fixed grip arm 44*a* so as to be opposed thereto and presses an upper surface of the sheet bundle. The fixed grip arm 44*a* is attached to a tabular first base member 140 as illustrated in FIGS. 6A and 6B. The movable grip arm 44*b* is attached to the fixed grip arm 44*a* so as to be pivotally movable in the up and down directions about a pivot shaft 143 taken as a fulcrum.

A coil spring 144 as urging means is provided on the pivot shaft 143. Both ends of the coil spring 144 are hung on the fixed grip arm 44*a* and the movable grip arm 44*b*, respectively. By an action of the coil spring 144, a grip portion 44*d* of the movable grip arm 44*b* is urged so as to be brought into pressure contact with a grip portion 44*c* of the fixed grip arm 44*a*. In such a way, the grip arm pair 44 turns to a closed state, and a grip force for gripping the sheets is imparted.

The second gripper unit 40*b* includes: a drive lever 142 that is illustrated in FIGS. 6A and 6B, and urges the movable grip arm 44*b* in a separating direction from the fixed grip arm 44*a*; and a grip motor GM1 that is illustrated in FIG. 4 and FIGS. 5A and 5B, and drives the drive lever 142. Drive of the grip motor GM1 is transmitted to the drive lever 142 through multiple gears GZ1 to GZ8 illustrated in FIGS. 6A and 6B. The drive mechanism that grips the sheet bundle by the grip arm pair 44 includes the drive lever 142, the grip motor GM1, and the multiple gears GZ1 to GZ8. A position of the drive lever 142 is detected in such a manner that a lever detection sensor GS1 detects a position of a detection flag 142*b* provided integrally with the drive lever 142. In this embodiment, when the grip arm pair 44 is in the closed state as illustrated in FIG. 6A, the lever detection sensor GS1 is turned ON. When the grip arm pair 44 is in an opened state as illustrated in FIG. 6B, the lever detection sensor GS1 is turned OFF.

Operations of the drive mechanism that grips the sheet bundle are described. In usual, the grip arm pair 44 is in the closed state as illustrated in FIG. 6A by the action of the coil spring 144. In the case of turning the grip arm pair 44 to the opened state, the grip motor GM1 is driven positively (rotated counterclockwise in FIG. 4). This drive of the grip motor GM1 is transmitted through the multiple gears GZ1 to GZ7 to the final gear GZ8 formed integrally with the drive lever 142. In such a way, the drive lever 142 pivotally moves to the movable grip arm 44*b* side about a shaft 142*a* taken as a fulcrum. After that, a tip end side of the drive lever 142 abuts against an abutting portion 44*e* of the movable grip arm 44*b*, which is formed on an opposite side to the grip portion 44*d* with respect to the pivot shaft 143, and moves the abutting portion 44*e* downward.

As a result, the grip portion 44*d* of the movable grip arm 44*b* rotates upward about the pivot shaft 143 taken as the fulcrum. As illustrated in FIG. 6B, the grip portion 44*d* of the movable grip arm 44*b* is spaced apart from the grip portion 44*c* of the fixed grip arm 44*a*. In such a way, the grip arm pair 44 turns from the closed state to the opened state. After that, when a predetermined period of time elapses from a point of time when the lever detection sensor GS1 stops detecting the detection flag 142*b* provided integrally with the drive lever 142, the grip motor GM1 is stopped. In such a way, the grip arm pair 44 is held in the opened state.

In the case of turning the grip arm pair 44 to the closed state, the grip motor GM1 is driven to rotate reversely (rotate clockwise). The grip motor GM1 is thus driven to rotate reversely, and thus the tip end portion of the drive lever 142 pivotally moves in a separating direction from the abutting portion 44*e* of the movable grip arm 44*b* about the shaft 142*a* taken as the fulcrum. Following this pivotal movement, the abutting portion 44*e* of the movable grip arm 44*b* rotates counterclockwise about the pivot shaft 143 as the fulcrum by the action of the coil spring 144. The tip end portion of the drive lever 142 is spaced apart from the abutting portion 44*e* of the movable grip arm 44*b*. In such a way, the grip arm pair 44 turns to the closed state as illustrated in FIG. 6A. The grip force for gripping the sheets is imparted to the movable grip arm 44*b* by an urging force of the coil spring 144. The grip motor GM1 is stopped at a point of time when the detection flag 142*b* is detected by the lever detection sensor GS1.

In this embodiment, as illustrated in FIG. 3, three (multiple) sets of the grip arm pairs 44, the coil springs 144 which impart the grip force, and the drive levers 142 which release the grip force are provided in the width direction. The three grip arm pairs 44 are driven by the single grip motor GM1. As illustrated in FIG. 3, the three grip arm pairs 44 are attached to the base member 140 illustrated in FIGS. 6A and 6B at predetermined intervals. The three drive levers 142 are individually attached to the shaft 142*a* attached to a second base member 141 so as to be hung on side portions thereof. In such a way, the gripper unit 40 can rotate the three drive levers 142 simultaneously, and in addition, can grip and transport (move) three spots of one side of the sheet.

The first gripper unit 40*a* is supported on the second gripper unit 40*b* so as to be slidable in parallel to the sheet delivery direction. A moving mechanism of the first gripper unit 40*a* is described. A widthwise end portion of the first base member 140 attached with the grip arm pair 44 illustrated in FIGS. 5A and 5B is bent downward. A moving rack GR1 for moving the first gripper unit 40*a* is attached with a corner portion of a bent portion 140*a* of the first base member 140. On the bent portion 140*a* of the first base member 140, a long hole 140*b* as a slide hole is formed.

A rotation shaft GZ10*a* of a pinion gear GZ10 that meshes with the moving rack GR1 penetrates the long hole 140*b*. The rotation shaft GZ10*a* is rotationally supported on a side plate 141*a* of the second gripper unit 40*b*. In such a way, when the pinion gear GZ10 provided on the second gripper unit 40*b* is rotated, the first gripper unit 40*a* moves through the moving rack GR1. By rotating the pinion gear GZ10, the first gripper unit 40*a* moves to the initial position illustrated in FIG. 5A and to the delivery position illustrated in FIG. 5B, at which the sheet is delivered. The moving rack GR1 is lowered toward a downstream side in the sheet delivery direction. In such a way, in the case where the first gripper unit 40*a* is located at the initial position, an upper portion of the grip arm pair 44 can be located so as to protrude from an upper surface of the processing tray 14. In the case where the first gripper unit 40*a* is located at the delivery position, the upper portion of the grip arm pair 44 can be located so as to be lower than the upper surface of the processing tray 14.

The drive mechanism for moving the first gripper unit 40*a* includes: the grip motor GM1; the multiple gripper gears GZ1 to GZ5; a gripper gear GZ9 provided on a rotation shaft of the fifth gripper gear GZ5; and the pinion gear GZ10. In this embodiment, the grip motor GM1 is used as a drive source for opening and closing the grip arm pair 44 and as a drive source for moving the first gripper unit 40*a*. In order to use the grip motor GM1 as such a common drive source, a tooth-lack gear in which a region that transmits the drive of the grip motor GM1 and a region that does not transmit the drive are formed is employed as the seventh gripper gear GZ7 for opening and closing the grip arm pair 44, which is illustrated in FIGS. 6A and 6B. A similar tooth-lack gear is also employed as the ninth gripper gear GZ9 for moving the first gripper unit 40*a*.

When the seventh gripper gear GZ7 as the tooth-lack gear opens and closes the grip arm pair 44 using a tooth portion as a part of an outer circumference thereof, a tooth-lack portion of the ninth gripper gear GZ9 is located at a position opposed to a subsequent gear, and the ninth gripper gear GZ9 does not transmit the drive to the subsequent gear. When the ninth gripper gear GZ9 as the tooth-lack gear moves the first gripper unit 40*a* using a tooth portion as a part of an outer circumference thereof, a tooth-lack portion of the seventh gripper gear GZ7 is located at a position opposed to a subsequent gear, and the seventh gripper gear GZ7 does not transmit the drive to the subsequent gear. The drive mechanism is structured using the tooth-lack gear, and thus the opening and closing operations of the grip arm pair 44 and the movement of the first gripper unit 40*a* can be switched easily.

A description is made of a configuration for moving the gripper unit 40 in the sheet delivery direction. As illustrated in FIG. 4, the gripper unit 40 includes the second base member 141. On a lower surface of the second base member 141, two slide pins 145 are provided in the width direction. The slide pins 145 engage with a groove portion of a fourth guide rail 43*d* for moving the gripper unit 40 in the width direction. The gripper unit 40 is connected to the fourth guide rail 43*d* by a connection mechanism in which the slide pins 145 engage with the groove portion of the fourth guide rail 43*d*. Details of the fourth guide rail 43*d* and the above-mentioned connection mechanism are described later.

Figure 7:
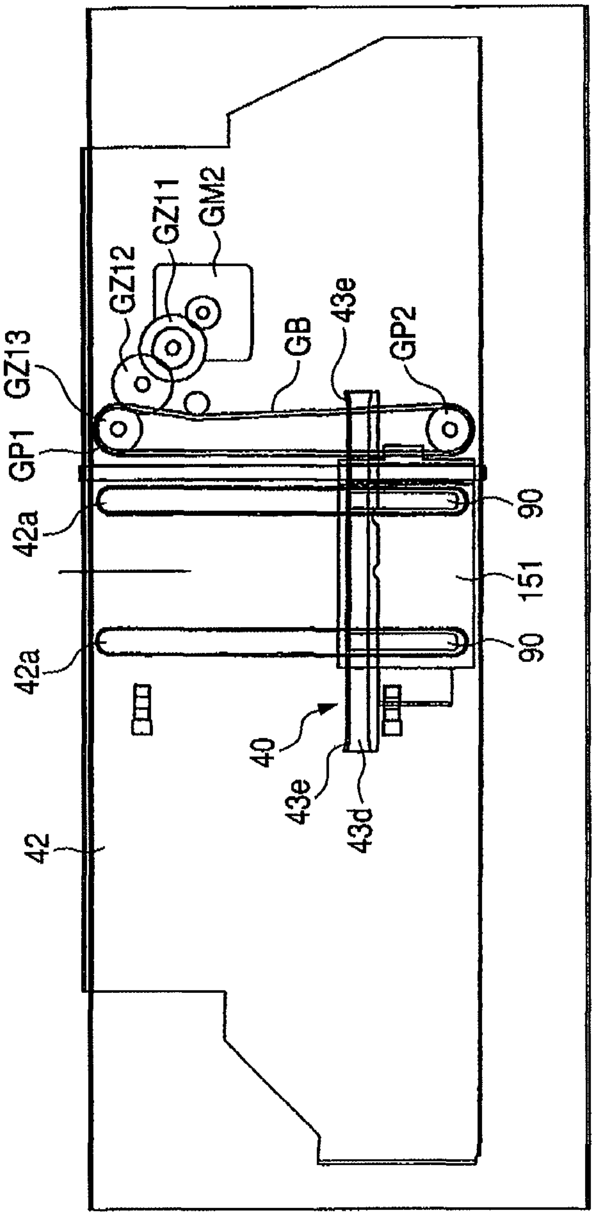
FIG. 7 illustrates a configuration for moving the gripper unit in a sheet delivery direction.

On predetermined spots of a bottom surface of the fourth guide rail 43*d*, engagement portions 90 are protruded downward. The engagement portions 90 engage with long grooves 42*a* which are formed in a base 42 and extended in the sheet delivery direction. The base 42 is illustrated in FIG. 7 and supports the gripper unit 40 and the stapler unit 41. The long grooves 42*a*, of which number is two, are formed at a predetermined interval so as to be parallel to each other. On the predetermined spots of the bottom surface of the fourth guide rail 43*d* connected to the gripper unit 40, the engagement portions 90, of which number is two, are provided parallel to each other so as to extend in the sheet delivery direction (FIG. 7). The two long grooves 42*a* constitute guide grooves which have a low shape so as not to prohibit the movement of the stapler unit (binding device) 41, and guide the gripper unit (gripping device) 40. The long grooves 42*a* as the guide grooves constitute a first guide portion that guides the gripper unit 40. The long grooves 42*a* are provided along the sheet delivery direction so as to guide the gripper unit 40 to at least a positioning region (gripping position) and the delivery position (retreat region/retreat position) P3. The positioning region is a region where the sheet is gripped and positioned at the staple process position GHP at which the binding process can be performed. At the delivery position (retreat region) P3, the gripper unit 40 is located downstream in the sheet delivery direction with respect to the positioning region (GHP), and is separated from a moving route for the stapler unit 41.

On lower surfaces of the engagement portions 90, bosses 152 for connecting to a plate-like member 151 arranged on a lower surface side of the base 42 are provided. The bosses 152 and fitting holes 151*a* of the plate-like member 151 fit to each other, and thus the fourth guide rail 43*d* is integrated with the plate-like member 151. The plate-like member 151 is connected to an endless belt GB provided along the long grooves 42*a* for moving the gripper unit 40. In such a way, when the endless belt GB is driven, the gripper unit 40 moves along the long grooves 42*a* integrally with the plate-like member 151 and the fourth guide rail 43*d*.

As illustrated in FIG. 7, the endless belt GB is driven by a gripper motor GM2, by a pair of pulleys GP1 and GP2 which suspend the endless belt GB, and by multiple gears GZ11 to GZ13 which transmit drive of the gripper motor GM2 to the endless belt GB. In this embodiment, a second moving mechanism (drive mechanism) for moving the gripper unit 40 in the sheet delivery direction intersecting the side of the sheet to be bound includes the following constituents. Specifically, the second moving mechanism includes the gripper motor GM2, the endless belt GB, the pair of pulleys GP1 and GP2, and the multiple gears GZ11 to GZ13.

The stapler unit 41 is described. The stapler unit 41 is structured by incorporating therein a staple head and an anvil block. The stapler unit 41 bends a needle-like staple into a U-shape, press-fits the bent staple into the sheet bundle, bends tip ends of the staple by the anvil block, and binds the sheet bundle. In this embodiment, upper and lower lever members in which base ends are pivottally supported with respect to each other are provided, the head block is attached to one of the upper and lower lever members, and the anvil block is attached to the other. Here, a general stapler unit is adopted, which reciprocally moves the upper and lower lever members by a drive cam member from spaced positions to press contact positions. In this embodiment, in response to the set modes, the stapler unit 41 can move to a position at which one end side of the sheet in the width direction is bound, to a position at which the other end side of the sheet, which is opposite to the one end side, is bound, and to a position at which two spots of one side of the sheet are bound.

Figure 8:
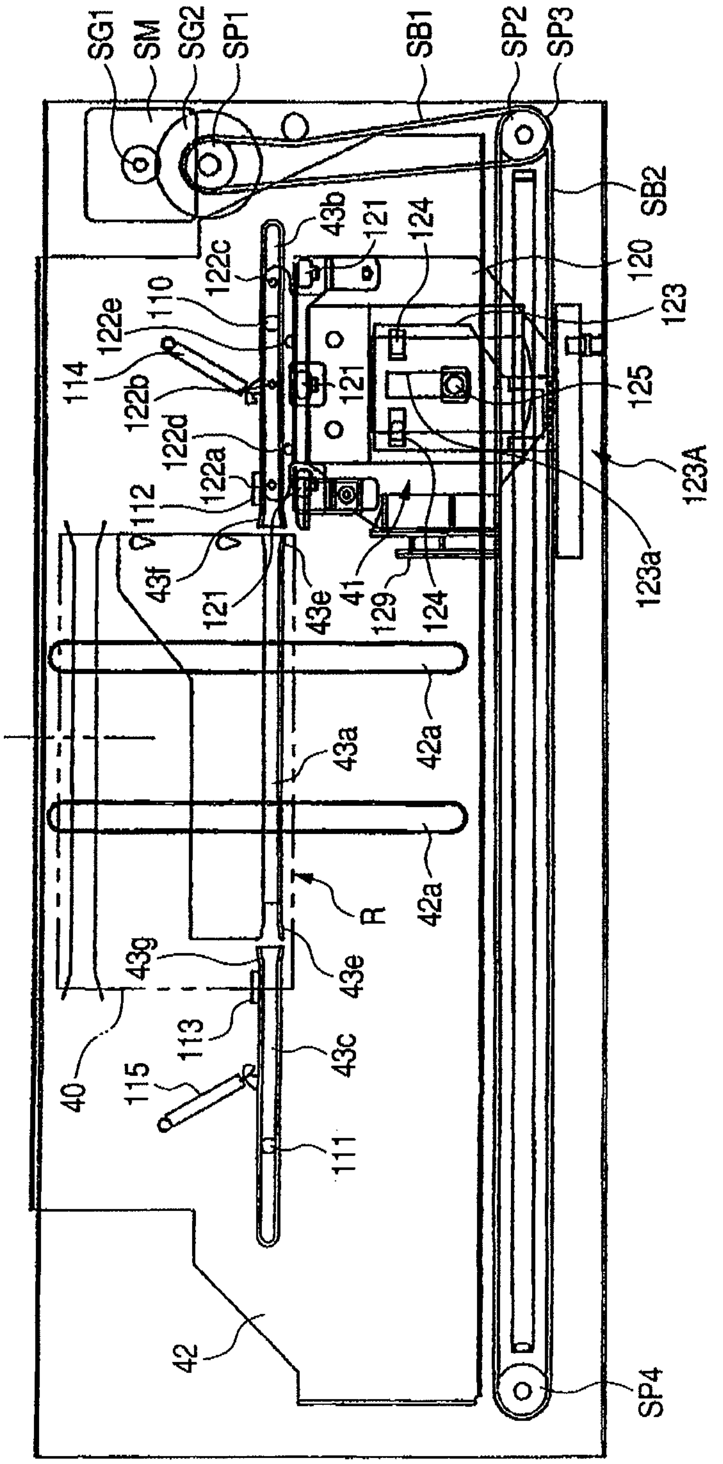
FIG. 8 illustrates a configuration for moving a stapler unit provided in the gripper/staple section of the sheet processing apparatus.

FIG. 8 illustrates a configuration for moving the stapler unit 41. The stapler unit 41 is attached onto a base member 120. On the base member 120, three rollers 121 for assisting the movement of the stapler unit 41 are provided. On the base member 120, three bosses 122*a* to 122*c* for moving the stapler unit 41 along a guide rail portion R by engaging with the guide rail portion R are provided. On the base member 120, two bosses 122*d* and 122*e* are provided, which are arranged in line on an upstream side in the sheet delivery direction with respect to the three bosses 122*a* to 122*c*, and are used at the time of connecting the gripper unit 40 and the stapler unit 41 to each other and moving both thereof. On a lower surface side of the base member 120, there is provided a connection member 123 to be connected to an endless belt SB2 for moving the stapler unit 41. In the connection member 123, two rollers 124 and a long hole 123*a* are provided, which are for assisting the movement of the stapler unit 41. A boss 125 provided on a lower surface of the base member 120 is allowed to penetrate the long hole 123*a* of the connection member 123. The long hole 123*a* is a long hole extended in a direction parallel to the sheet delivery direction, and the boss 125 is structured so as to be movable along the long hole 123*a* in the direction parallel to the sheet delivery direction.

A drive mechanism for moving the stapler unit 41 includes: a staple motor SM; a gear SG1 attached to a drive shaft of the staple motor SM; and a gear SG2 that meshes with the gear SG1. The drive mechanism further includes: a pulley SP1 attached to a rotation shaft of the gear SG2; and a pulley SP2 which makes a pair with the pulley SP1 and on which a timing belt SB1 is hung. The drive mechanism further includes: a pulley SP3 that is provided on a rotation shaft of the pulley SP2 and hangs the endless belt SB2 thereon; and a pulley SP4 that makes a pair with the pulley SP3 and hangs the endless belt SB2 thereon. The motor SM, the timing belt SB1, the endless belt SB2, the base member 120, the gears SG1 and SG2, and the pulleys SP1 to SP4 constitute a first moving mechanism. The first moving mechanism moves the stapler unit 41 along one side of the sheets, which are to be bound, in a direction intersecting the sheet delivery direction.

The guide rail portion R for moving the stapler unit 41 in the width direction is provided on the base 42 on which the gripper unit 40 moves. The guide rail portion R is formed to be larger than a width of the largest sheet. By moving the stapler unit 41 along the guide rail portion R, a predetermined position on one end side of the sheet can be bound.

In the drive mechanism, drive of the staple motor SM is transmitted to the endless belt SB2 through the timing belt SB1 so that the endless belt SB2 rotates. The connection member 123 moves by the rotation of the endless belt SB2. When the connection member 123 moves, the base member 120 and the stapler unit 41 attached to the base member 120 move along the guide rail portion R through the boss 125.

Figure 9:
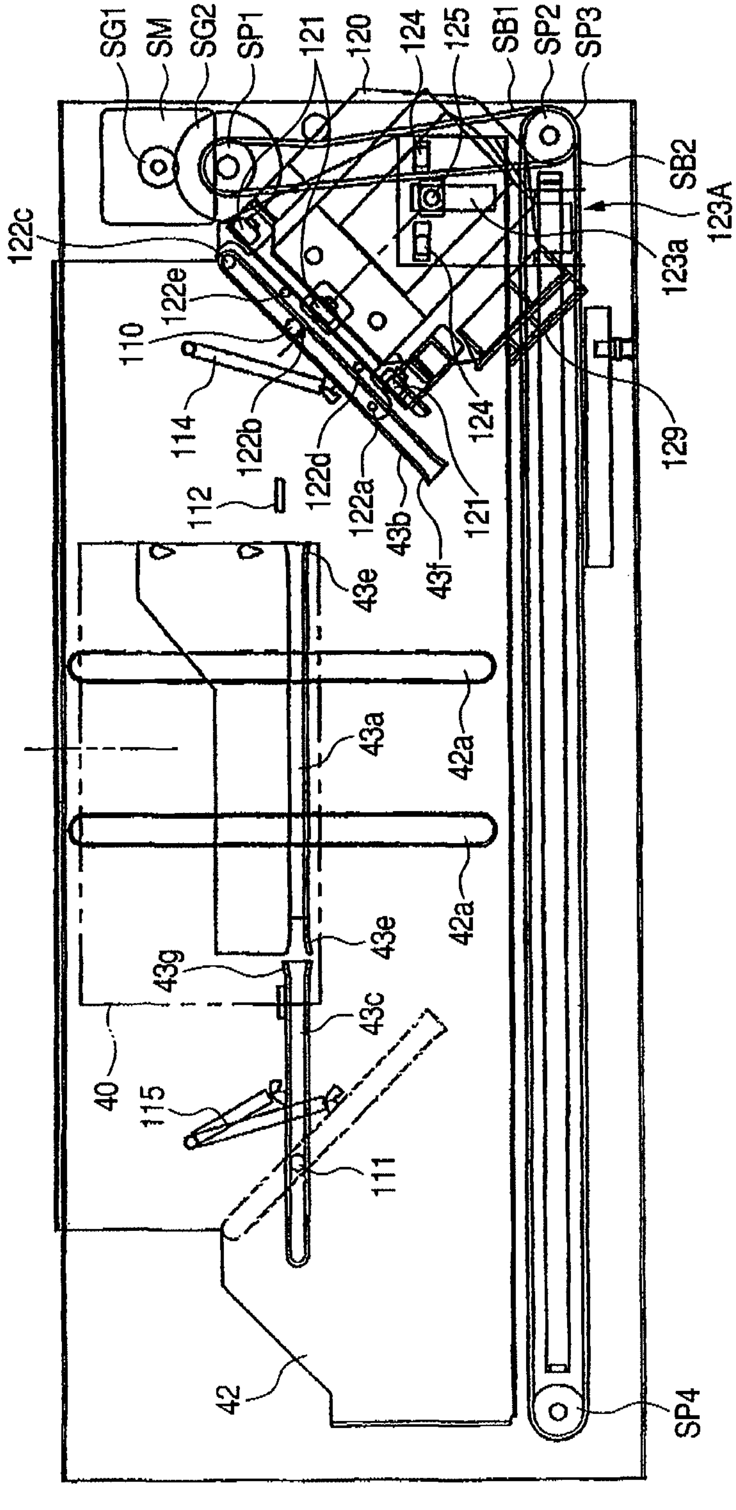
FIG. 9 illustrates a state in which the stapler unit is tilted.

In this embodiment, two binding processes can be performed, which are: an end binding process of binding any one of both ends of the sheet at a corresponding binding position; and a two-spot binding process of binding two spots on a substantial center portion in the width direction of one side of the sheet. Binding positions are the first binding position and the second binding position. The first binding position is a position of the stapler unit 41, which is illustrated in FIG. 9. The second binding position is a position opposite to the first binding position illustrated in FIG. 9 in the width direction. A configuration of the guide rail portion R differs between the case of the end binding process and the two-spot binding process.

The guide rail portion R in the case of the end binding process is divided into three guide rails, that is, a first guide rail 43*a* to a third guide rail 43*c* in the width direction. The first guide rail 43*a* as a center guide rail located at a center among the three guide rails 43*a* to 43*c* is fixed to a rear portion of a bottom portion of the gripper unit 40 as illustrated in FIG. 4. Here, the rear portion of the bottom portion is located on the upstream side in the sheet delivery direction. The second guide rail 43*b* and the third guide rail 43*c* as end-side guide rails located on both sides of the first guide rail 43*a* are individually attached onto the base 42.

When the gripper unit 40 is located in the predetermined retreat region (retreat position) where the gripper unit 40 does not prohibit the movement of the stapler unit 41, the first guide rail 43*a* is provided so as to be in line (linearly) with the second guide rail 43*b* and the third guide rail 43*c*. When the first guide rail 43*a* to the third guide rail 43*c* are arranged in line with one another, the three bosses 122*a* to 122*c* arranged in line on the stapler unit 41 engage with the first guide rail 43*a* to the third guide rail 43*c*, and thus the stapler unit 41 moves in the width direction.

Onto a front bottom portion (bottom portion on the upstream side in the sheet delivery direction) of the base member 120 that supports the stapler unit 41, the bosses 122*a* to 122*c* for moving the stapler unit 41 are attached. The bosses 122*a* to 122*c* engage with the guide rail portion R and are guided thereby. On both end portions of the first guide rail 43*a*, wide portions (first wide portions) 43*e* are formed (refer to FIG. 7 to FIG. 9). At the time when the first guide rail 43*a* is opposed to the second guide rail 43*b* and the third guide rail 43*c*, the wide portions 43*e* introduce the bosses 122*a* to 122*c* as protruding portions thereinto and facilitate the bosses 122*a* to 122*c* to pass therethrough. On the respective end portions of the second guide rail 43*b* and the third guide rail 43*c*, which are opposed to the end portions of the first guide rail 43*a*, wide portions (second wide portions) 43*f* and 43*g* which introduce the bosses 122*a* to 122*c* thereinto and facilitate the bosses 122*a* to 122*c* to pass therethrough are individually formed (refer to FIG. 7 to FIG. 9). In such a way, the stapler unit 41 can smoothly move along the guide rail portion R.

With such a configuration, when the stapler unit 41 moves to the opposite side with respect to the gripper unit 40 in order to bind the end portions of the sheets, the gripper unit 40 has moved to the retreat region where the gripper unit 40 does not prohibit the movement of the stapler unit 41. Accordingly, the gripper unit 40 does not prohibit the movement of the stapler unit 41 in the width direction. Hence, before the sheets are transported to the processing tray 14, the stapler unit 41 can be moved in advance to a sheet corner portion side on which the binding process is performed. The gripper unit 40 is arranged so as to grip the substantial widthwise center portion of each of the sheets. Therefore, the stapler unit 41 does not prohibit the movement of the gripper unit 40 in such a manner that the stapler unit 41 is moved in advance to the sheet corner portion side.

The first guide rail 43*a*, the second guide rail 43*b*, and the third guide rail 43*c* constitute a second guide portion that guides the gripper unit (binding device) 40. The second guide rail 43*b* and the third guide rail 43*c* constitute a pair of end-side guide rails which are arranged so as to be linear at a predetermined interval along the width direction intersecting the sheet delivery direction. The guide rail 43*a* is fixed to a rear portion of the gripper unit 40 along the width direction. When the gripper unit 40 moves to the retreat region (P3), the guide rail 43*a* is located between the guide rails 43*b* and 43*c*, and constitutes a center guide rail arrayed in line with the guide rails 43*b* and 43*c*.

The second guide rail 43*b* and the third guide rail 43*c* located on both sides of the first guide rail 43*a* are attached onto the base 42 so as to be pivotable by swing shafts 110 and 111, respectively. In such a way, in the case of implementing the end binding process by the stapler unit 41, the stapler unit 41 can implement the binding process for the end portions (corner portions) of the sheets while being tilted at approximately 45°. The swing shafts 110 and 111 are arranged on the downstream side in the sheet delivery direction with respect to the boss 125 provided on the lower surface of the base member 120.

A description is made of a configuration for tilting the stapler unit 41 at approximately 45°. A configuration for binding the end portions on the second guide rail 43*b* side and a configuration for binding the end portions on the third guide rail 43c side are the same while being crosswise symmetric to each other. Therefore, for the sake of convenience, the description is made here only of the configuration on the second guide rail 43b side.

As illustrated in FIG. 8, a tensile spring 114 is provided between a spot of the second guide rail 43b in an inside of the swing shaft 110, and the base 42. By an action of the tensile spring 114, the second guide rail 43b is always urged clockwise in FIG. 8. The inside refers to a region between a comparison subject and the center in the width direction of each of the sheets transported to the sheet processing apparatus C. Here, the width direction is the same as the direction intersecting the sheet delivery direction. In an inside of the swing shaft 110 on the base 42, a regulating member 112 is provided, which regulates the second guide rail 43b always urged by the tensile spring 114. By the regulating member 112, the second guide rail 43b is held in a state of intersecting the sheet delivery direction, and forms the continuing guide rail portion R together with the first guide rail 43a attached to the gripper unit 40. On the third guide rail 43c side, a tensile spring 115 and a regulating member 113 function in a similar way to the above.

When the endless belt SB2 is driven, and the stapler unit 41 is moved outward along the second guide rail 43b, the boss 122c of the base member 120 engaging with the second guide rail 43b is thrust against an end portion of the second guide rail 43b. The moving outward refers to moving in a separating direction from the center in the width direction of the sheet transported to the sheet processing apparatus C. Here, the width direction is the same as the direction intersecting the sheet delivery direction. In such a way, the stapler unit 41 is regulated from moving in the width direction. When the endless belt SB2 is further driven under this state, the connection member 123 connected to the endless belt SB2 moves following the drive of the endless belt SB2. Following this movement, the boss 125 of the base member 120 is pulled outward.

At this time, the base member 120 is regulated from moving in the width direction by the end portion of the second guide rail 43b. The swing shaft 110 is arranged on the downstream side in the sheet delivery direction with respect to the boss 125. Therefore, when the boss 125 is pulled, as illustrated in FIG. 9, the base member 120 and the stapler unit 41 then rotate integrally with each other about the swing shaft 110 as a fulcrum while causing the boss 125 to move in the sheet delivery direction along the long hole 123a of the connection member 123. In this event, the base member 120 and the stapler unit 41 cause the second guide rail 43b to rotate counterclockwise about the swing shaft 110 as the fulcrum against the tensile spring 114. In such a way, the stapler unit 41 is positioned so as to be tilted with respect to one side of the sheet, and can perform oblique binding for the corner portion (end portion) of the sheet.

The gripper unit 40 is located in a widthwise center portion of the base 42. Accordingly, in the case of implementing the two-spot binding, the stapler unit 41 overlaps the gripper unit 40 in the width direction. Therefore, the gripper unit 40 becomes an obstacle, and the stapler unit 41 cannot perform the two-spot binding in this state. In this embodiment, in the case where the two-spot binding is implemented, the gripper unit 40 is moved to the position at which the gripper unit 40 does not prohibit the two-spot binding implemented by the stapler unit 41. At the time when the stapler unit 41 moves to the position of implementing the two-spot binding, the gripper unit 40 is moved in the width direction integrally with the stapler unit 41.

The gripper unit 40 is moved in the width direction integrally with the stapler unit 41. Accordingly, in the case where the two-spot binding is implemented, the gripper unit 40 is first moved to the unit connection position P2 illustrated in FIG. 3. When the gripper unit 40 moves, the fourth guide rail 43d attached to the bottom surface of the gripper unit 40, which is illustrated in FIG. 4, moves to the upstream side in the sheet delivery direction with respect to the second guide rail 43b and the third guide rail 43c illustrated in FIG. 7. This position corresponds to the two bosses 122d and 122e arranged in line on the upstream side in the sheet delivery direction with respect to the three bosses 122a to 122c.

In such a way, in the case where the stapler unit 41 and the gripper unit 40 are connected to each other, the stapler unit 41 is movable in the width direction together with the gripper unit 40 while engaging the two bosses 122d and 122e with the fourth guide rail 43d. At the time when the two-spot binding is implemented, in the case where the stapler unit 41 moves from the second guide rail side to the third guide rail side, the stapler unit 41 first moves in such a manner that the bosses 122a to 122c engage with the second guide rail 43b. Next, the boss 122a on a moving side of the stapler unit 41 is detached from the second guide rail 43b. Then, the boss 122d of the stapler unit 41 engages with the fourth guide rail 43d, which has moved to the position illustrated in FIG. 7, following the movement of the gripper unit 40.

As a result, following the movement of the gripper unit 40, the stapler unit 41 is transferred from the second guide rail 43b to the fourth guide rail 43d, and is held on the fourth guide rail 43d. When the boss 122d of the stapler unit 41 is detached from the fourth guide rail 43b, the boss 122a of the stapler unit 41 then engages with the third guide rail 43c. At the time of moving while being connected to the stapler unit 41, the gripper unit 40 is detached from the fourth guide rail 43d. The gripper unit 40 is fixed and connected to the stapler unit 41 so as not to move in the width direction and the sheet delivery direction. In such a way, the gripper unit 40 moves following the movement of the stapler unit 41 without any trouble.

FIGS. 10A and 10B and FIGS. 11A and 11B illustrate a unit connection mechanism that connects the gripper unit 40 and the stapler unit 41 to each other. As illustrated in FIGS. 10A and 10B and FIGS. 11A and 11B, the unit connection mechanism includes a first unit connection mechanism 60a that connects the gripper unit 40 and the stapler unit 41 to each other in the sheet delivery direction. The unit connection mechanism includes a second unit connection mechanism 60b that connects the stapler unit 41 and the gripper unit 40 to each other in the width direction.

The first unit connection mechanism 60a includes: an engagement member 129 attached to the base member 120 of the stapler unit 41, which is illustrated in FIG. 8; and a connection arm member 132 that is pivottally supported on a side portion of the second base member 141 of the gripper unit 40. The first unit connection mechanism 60a includes an operation member 131 provided on the shaft 142a of the drive lever 142 for opening and closing the grip arm pair 44. On one end of the connection arm member 132, an engagement pin 132a that engages with a groove portion 129a of the engagement member 129 is formed. On the other end of the connection arm member 132, an operation pin 132b to be fitted to a slit 131a of the operation member 131 is formed.

Figure 10A:
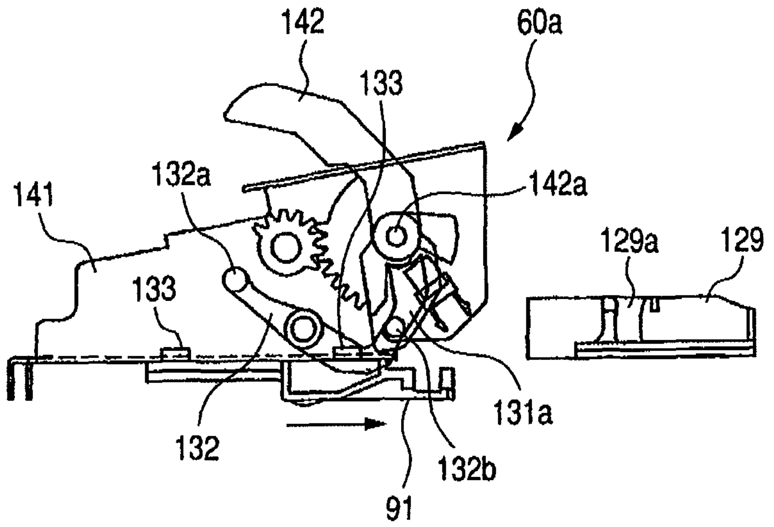
FIGS. 10A and 10B illustrate a unit connection mechanism that connects the gripper unit and the stapler unit to each other.
Figure 10B:
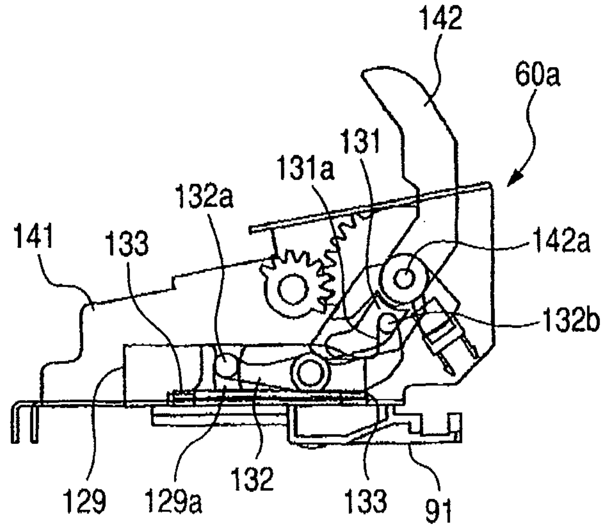

At the time when the gripper unit 40 moves to the unit connection position P2, the gripper unit 40 moves in an arrow direction of FIG. 10A under a state in which the engagement pin 132a of the connection arm member 132 is located at an upper retreat position as illustrated in FIG. 10A. The gripper unit 40 arrives at the connection position at which the fourth guide rail 43*d* is located on the upstream side in the sheet delivery direction with respect to the second guide rail 43*b* and the third guide rail 43*c*. Then, the gripper motor GM2 is driven to cause the operation member 131 to pivot clockwise. In such a way, the operation pin 132*b* to be fitted to the slit 131*a* of the operation member 131 is lifted upward. The connection arm member 132 rotates counterclockwise about a shaft thereof taken as a fulcrum. Following this rotation, the engagement pin 132*a* of the connection arm member 132 engages with the groove portion 129*a* of the engagement member 129 as illustrated in FIG. 10B.

Figure 11B:
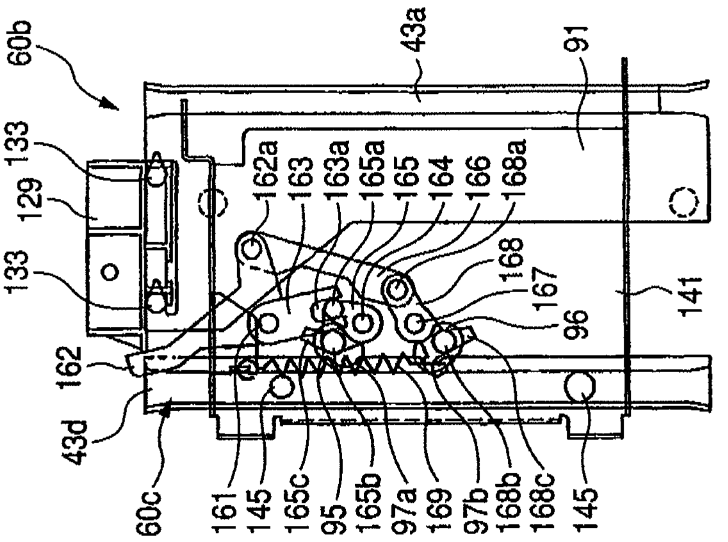
FIGS. 11A and 11B illustrate a connection mechanism that connects the unit connection mechanism and the gripper unit to a fourth guide rail.

The second unit connection mechanism 60*b* includes a connection member 91 attached to the lower surface of the second base member 141. On a widthwise end portion side of the connection member 91, two protrusions 133 are formed. The protrusions 133 of the connection member 91 enter a groove portion (not shown) formed on a lower surface side of the engagement member 129 as illustrated in FIG. 10B and FIG. 11B in such a manner that the gripper unit 40 moves to the unit connection position P2. In such a way, the stapler unit 41 and the gripper unit 40 are connected to each other in the width direction, and move integrally with each other in the width direction. In this embodiment, the connection member 91 and the first guide rail 43*a* are formed of a resin integrally with each other.

In order to connect the gripper unit 40 to the stapler unit 41 and to move the gripper unit 40 and the stapler unit 41 in the width direction, the gripper unit 40 and the fourth guide rail 43*d* must be separated from each other. This is because the fourth guide rail 43*d* is used as a rail for moving the stapler unit 41. It is necessary to disconnect the drive between the gripper unit 40 and the gripper motor GM2. Therefore, in this embodiment, the fourth guide rail 43*d* is integrated with the plate-like member 151, and the plate-like member 151 is connected to the endless belt GB driven by the gripper motor GM2. The fourth guide rail 43*d* and the gripper unit 40 are structured so as to be connected to and disconnected from each other. In such a way, the connection/disconnection between the gripper unit 40 and the fourth guide rail 43*d* and the connection/disconnection of the drive between the gripper unit 40 and the gripper motor GM2 can be performed simultaneously by using one mechanism.

A connection mechanism 60*c* that connects the gripper unit 40 and the fourth guide rail 43*d* to each other is described with reference to FIGS. 11A and 11B. The connection mechanism 60*c* includes: a swing lever 162 attached to a first swing shaft 161 provided on an upper surface of the second base member 141; and a swing member 163 that is attached to the first swing shaft 161 and swings following a swing operation of the swing lever 162. The connection mechanism 60*c* includes a first operation member 165 that is attached to a second swing shaft 164 provided on the upper surface of the second base member 141 and includes a pin 165*a* formed thereon. The pin 165*a* engages with a slit 163*a* of the swing member 163. Moreover, the connection mechanism 60*c* includes a link member 166 in which a hole to be fitted to a pin 162*a* formed on the swing lever 162 is formed on one end side. Further, the connection mechanism 60*c* includes a second operation member 168 that is attached to a third swing shaft (rotation shaft) 167 and includes a pin 168*a* formed thereon. The pin 168*a* is to be fitted to a hole formed on the other end side of the link member 166.

On the first operation member 165, there are provided: a columnar first operation pin 165*b* extended from the upper surface of the second base member 141 to the lower surface side thereof; and a first operation piece 165*c* formed on a tip end of the first operation pin 165*b* on an extended side thereof. The first operation pin 165*b* is fitted to a curved portion 97*a* by the swing of the first operation member 165. Here, the curved portion 97*a* is formed on a side surface of a projection portion that forms a groove of the fourth guide rail 43*d*. Whereby, the projection portion of the fourth guide rail 43*d* is sandwiched between the first operation pin 165*b* and the slide pins 145 which are provided on a bottom surface of the second base member 141 and engage with the groove of the fourth guide rail 43*d*. The first operation piece 165*c* moves to a lower surface of the projection portion of the fourth guide rail 43*d* by the swing of the first operation member 165, and sandwiches the projection portion of the fourth guide rail 43*d* with the lower surface of the second base member 141.

On the second operation member 168, there are formed: a columnar second operation pin 168*b* extended from the upper surface of the second base member 141 to the lower surface side thereof; and a second operation piece 168*c* formed on a tip end of the second operation pin 168*b* on an extended side thereof. The second operation pin 168*b* is fitted to a curved portion 97*b* by the swing of the second operation member 168. Here, the curved portion 97*b* is formed on the side surface of the projection portion of the fourth guide rail 43*d*. Then, the second operation piece 168*c* moves to the lower surface of the projection portion of the fourth guide rail 43*d*. In such a way, the second operation pin 168*b* sandwiches the projection portion of the fourth guide rail 43*d* with the slide pins 145. The second operation piece 168*c* sandwiches the projection portion of the fourth guide rail 43*d* with the bottom surface of the base member 141.

Between the second operation member 168 and the second base member 141, a tensile spring 169 is provided. The tensile spring 169 rotationally urges the second operation member 168 clockwise in FIGS. 11A and 11B about the third rotation shaft 167 taken as a fulcrum. Openings 95 and 96 are formed in the second base member 141 for allowing the movement of the first operation pin 165*b* and the second operation pin 168*b*.

Figure 11A:
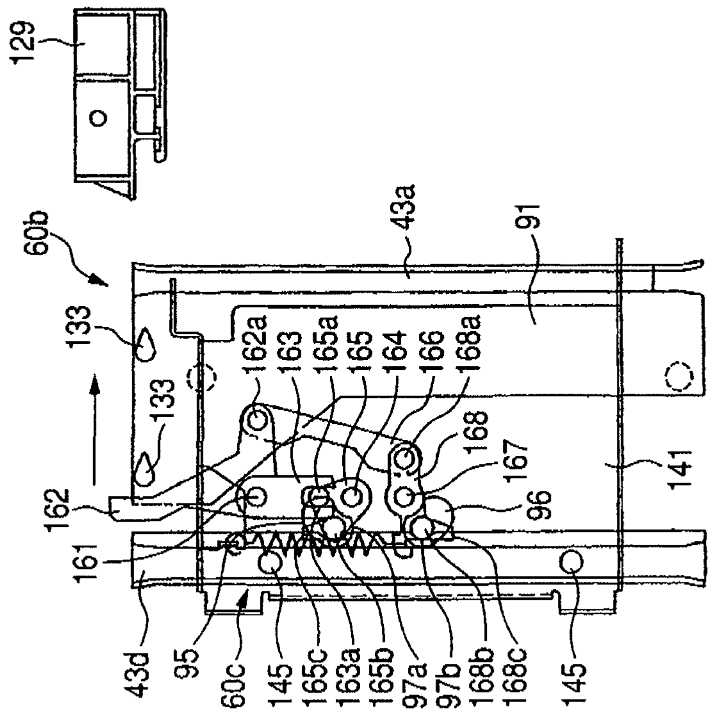

Under a state before the gripper unit 40 moves to and arrives at the connection position, the second operation member 168 rotates clockwise by an action of the tensile spring 169 as illustrated in FIG. 11A. In such a way, the second operation pin 168*b* is fitted to the curved portion 97*b* on the side surface of the projection portion of the fourth guide rail 43*d*, and the second operation piece (operation piece) 168*c* moves to below the lower surface of the projection portion. The clockwise rotation of the second operation member 168 is transmitted to the swing lever 162 through the link member 166, and causes the swing lever 162 to rotate clockwise. By the rotation of the swing lever 162, the swing member 163 rotates clockwise. Then, the first operation member 165 rotates counterclockwise by the swing member 163. In such a way, the first operation pin 165*b* is fitted to the curved portion 97*a* on the side surface of the projection portion of the fourth guide rail, and the second operation piece 168*c* moves to below the lower surface of the projection portion.

When the gripper unit 40 arrives at the connection position, a tip end of the swing lever 162 abuts against the engagement member 129 on the stapler unit 41 side, and the swing lever 162 rotates counterclockwise against the action of the tensile spring 169. By such a rotational operation, the swing member 163 rotates counterclockwise, and the first operation member 165 rotates clockwise. In such a way, as illustrated in FIG. 11B, the first operation pin 165*b* is spaced apart from the curved portion 97*a* of the projection portion of the fourth guide rail 43*d*, and the first operation piece 165*c* moves to a position retreated from the lower surface of the projection portion of the fourth guide rail 43*d*. When the swing lever 162 rotates counterclockwise, the rotation is transmitted to the second operation member 168 through the link member 166, and the second operation member 168 rotates clockwise. In such a way, the second operation pin 168*b* is spaced from the curved portion 97*b* of the projection portion of the fourth guide rail 43*d*, and the second operation piece 168*c* moves to a position retreated from the lower surface of the projection portion of the fourth guide rail 43*d*.

In this embodiment, before the gripper unit 40 moves to and arrives at the connection position, the side of the projection portion of the fourth guide rail 43*d* is sandwiched between the slide pins 145 of the second base member 141, and the first operation pin 165*b* and the second operation pin 168*b*. The upper and lower sides of the projection portion of the fourth guide rail 43*d* are sandwiched between the lower surface of the second base member 141, and the first operation piece 165*c* and the second operation piece 168*c*. In such a way, the gripper unit 40 and the fourth guide rail 43*d* are connected to each other.

When the gripper unit 40 is moved to the connection position thereof to the stapler unit 41, the swing lever 162 is thrust against the engagement member 129. In such a way, the swing lever 162 swings. By the swing of the swing lever 162, the first operation pin 165*b* and the second operation pin 168*b* are spaced apart from the side portion of the projection portion of the fourth guide rail 43*d*. The first operation piece 165*c* and the second operation piece 168*c* are moved to the positions retreated from the lower surface of the projection portion of the fourth guide rail 43*d*. In such a way, the gripper unit 40 and the fourth guide rail 43*d* are disconnected from each other so that the gripper unit 40 can move in the width direction.

Figure 22:
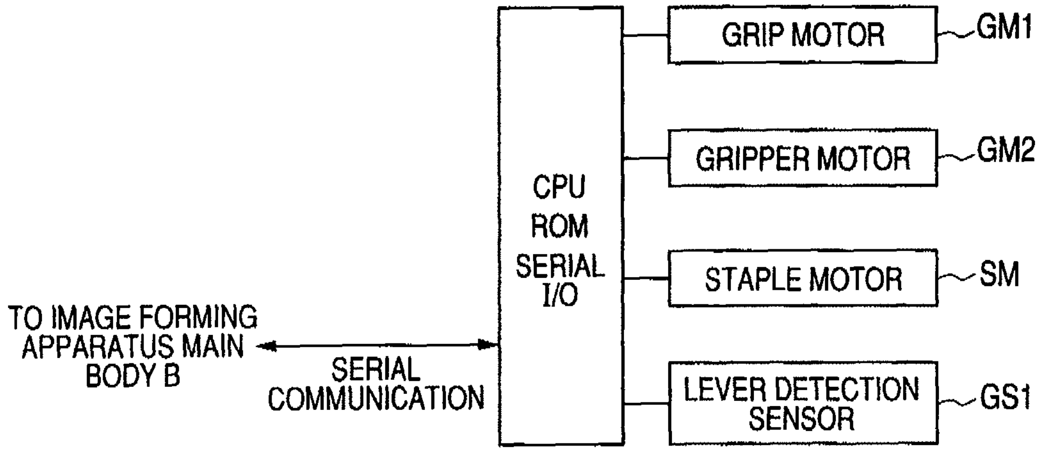
FIG. 22 is a control block diagram illustrating the sheet processing apparatus.

FIG. 22 is a control block diagram of the sheet processing apparatus C. The grip motor GM1, the gripper motor GM2, and the staple motor SM are connected to a central processing unit (CPU) as the control unit G. The CPU is connected to the lever detection sensor GS1 so as to receive a detection signal of the lever detection sensor GS1. Further, the CPU has a read only memory (ROM) therein. In the ROM, programs corresponding to control procedures illustrated in FIG. 12 to FIG. 20, and the like are stored. The CPU controls the respective motors while reading out the programs. The CPU includes a serial interface unit (I/O), and transfers control data therethrough with the image forming apparatus main body B. Further, the CPU controls the respective units based on the control data sent from (a control unit of) the image forming apparatus main body B through the serial interface unit (I/O). In this embodiment, the CPU is provided in the sheet processing apparatus C. However, the CPU may be provided in the image forming apparatus main body B.

Figure 12:
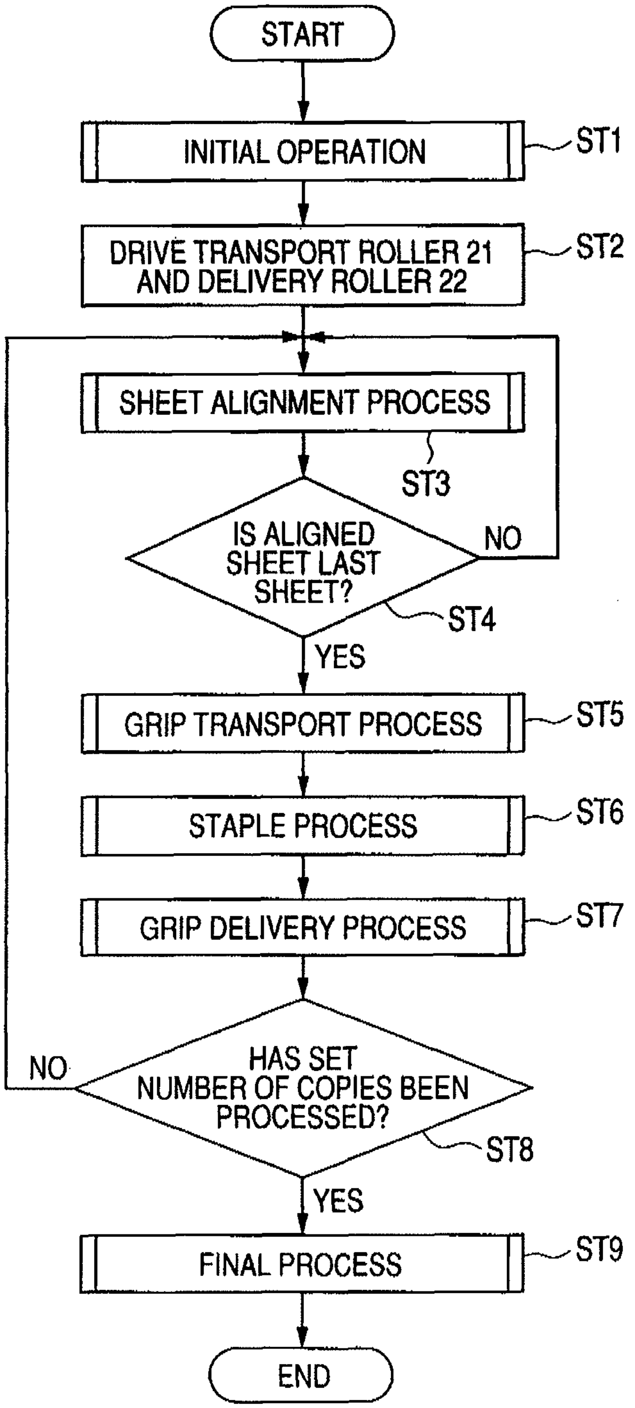
FIG. 12 is a main operation flowchart illustrating a main flow of a staple operation of the sheet processing apparatus.
Figure 13:
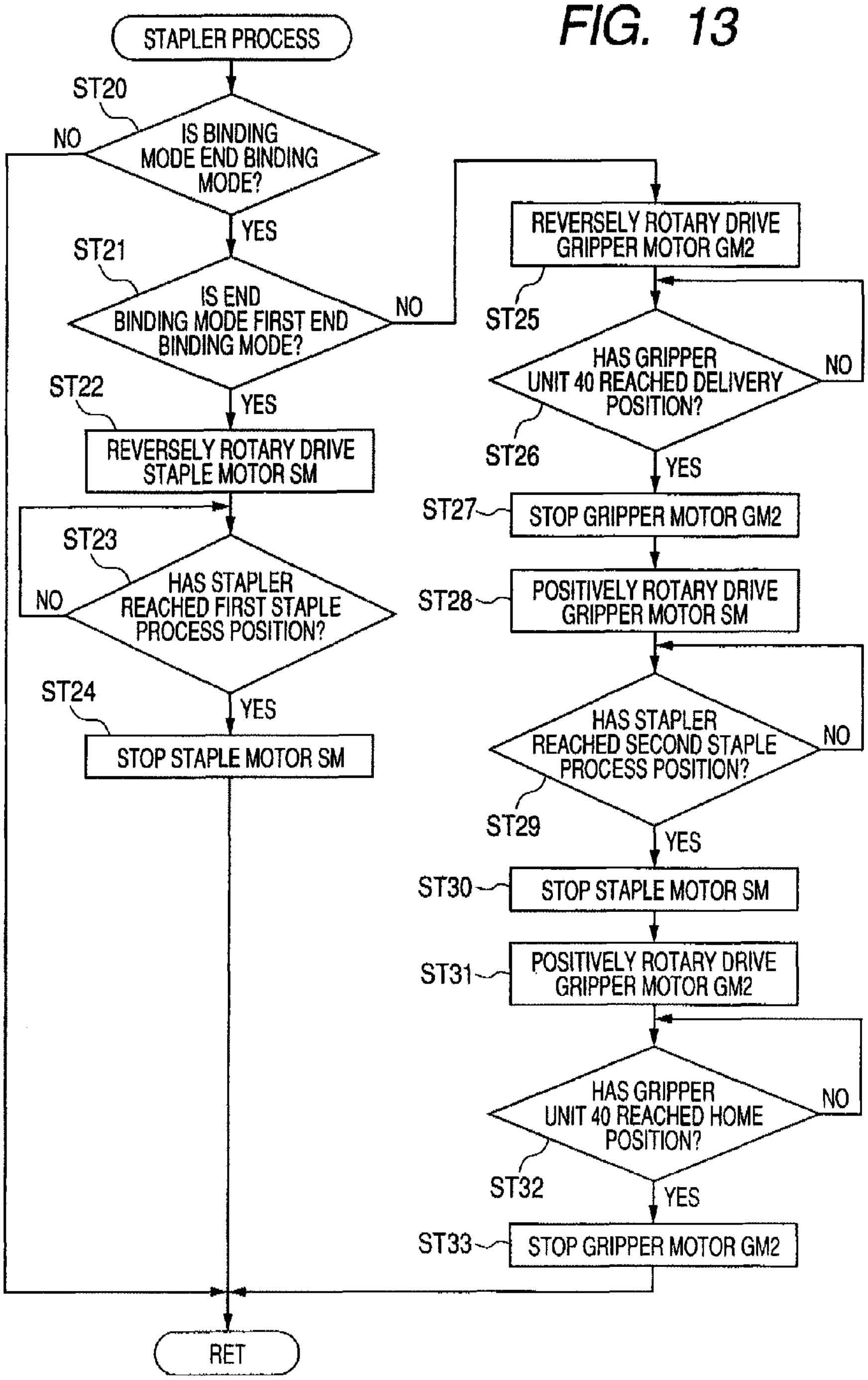
FIG. 13 is an operation flowchart illustrating a pre-staple process of the sheet processing apparatus.
Figure 14:
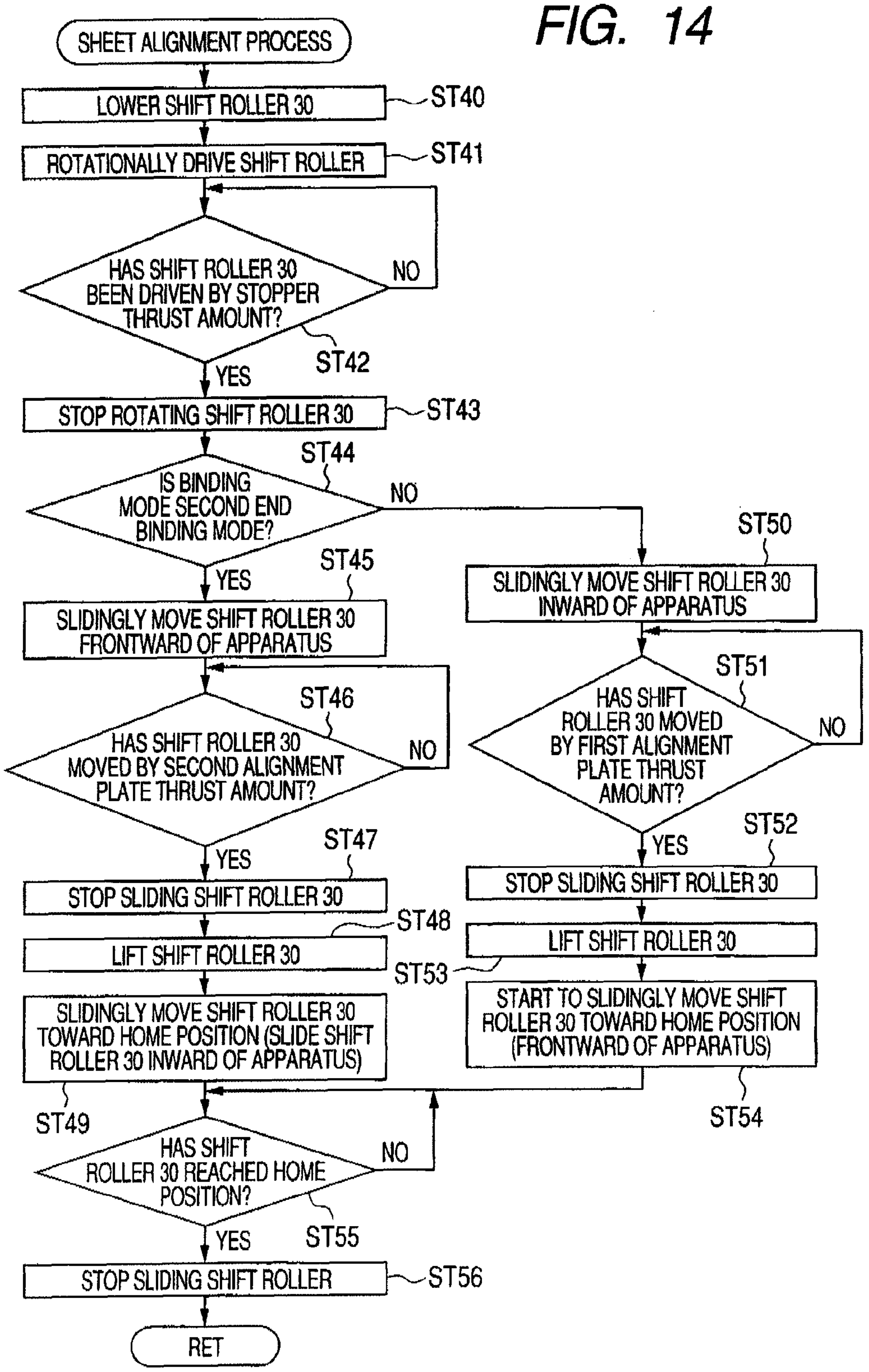
FIG. 14 is an operation flowchart illustrating a sheet alignment process of the sheet processing apparatus.
Figure 15:
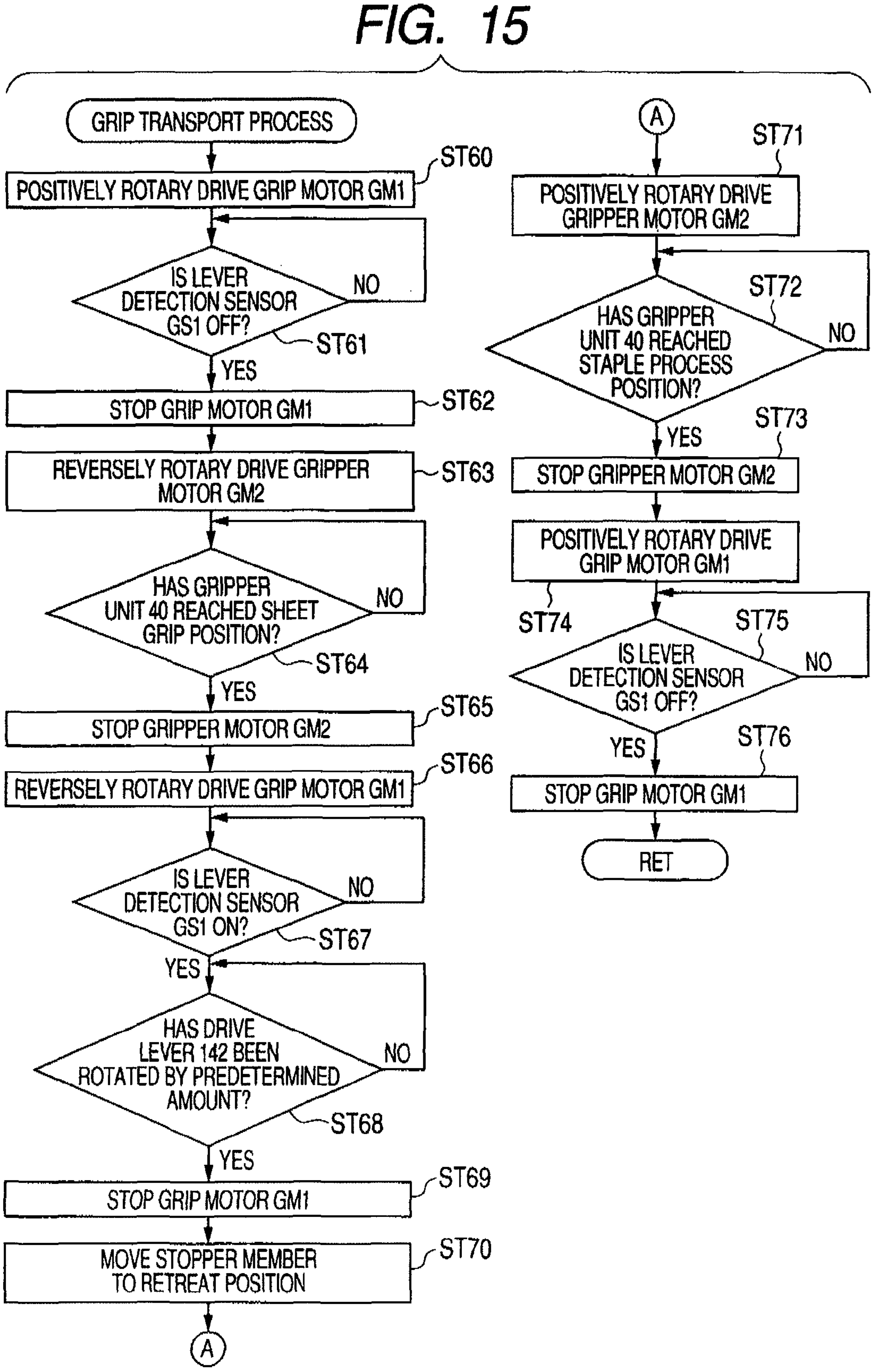
FIG. 15 is an operation flowchart illustrating a grip transport process of the sheet processing apparatus.
Figure 16:
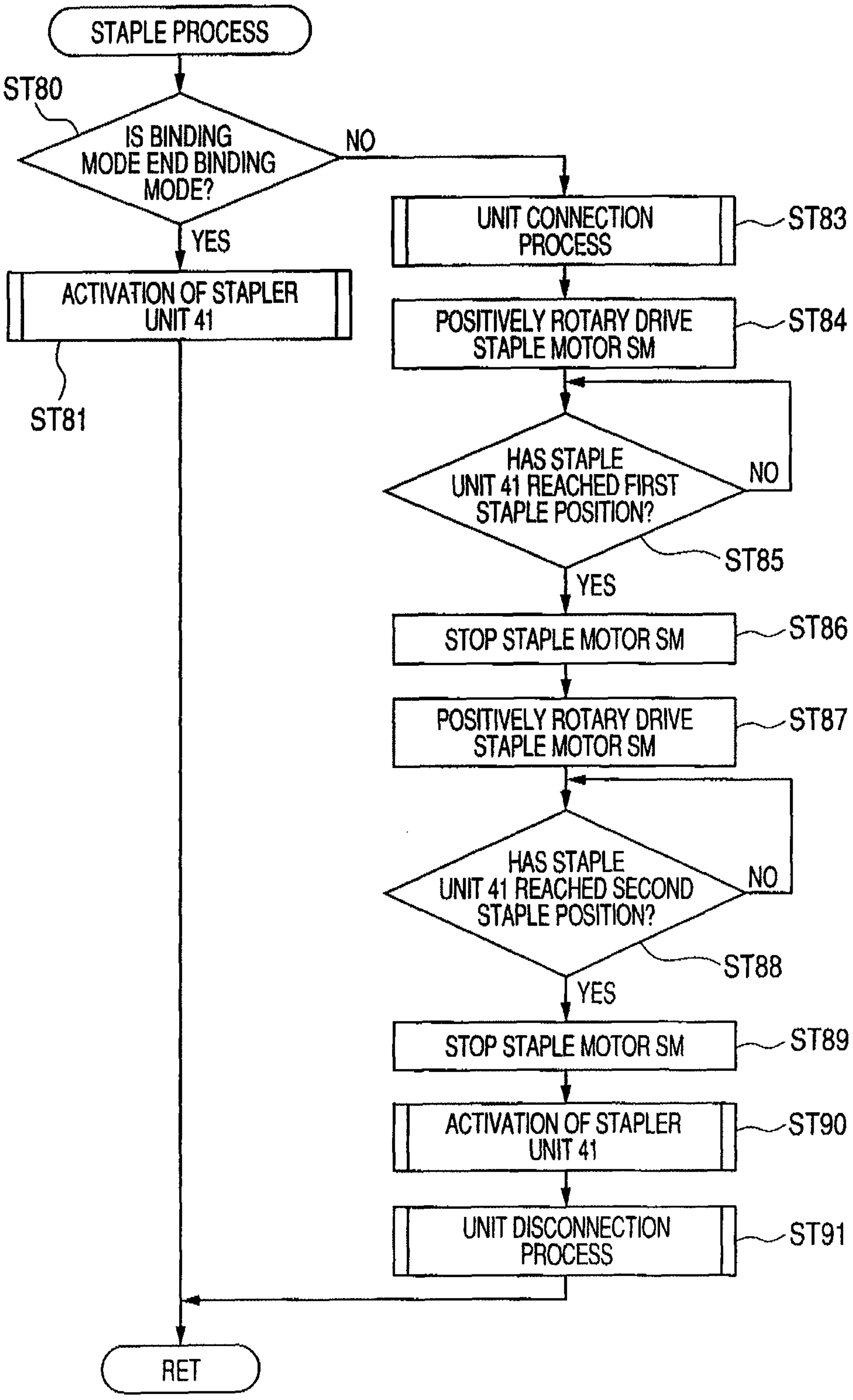
FIG. 16 is an operation flowchart illustrating a staple process of the sheet processing apparatus.

A staple operation of the sheet processing apparatus C is described. This staple operation is controlled by the control unit G provided in the sheet processing apparatus C or the image forming apparatus main body B, which is illustrated in FIG. 1. FIG. 12 is a main operation flowchart illustrating a main flow of the staple operation of the sheet processing apparatus C. The staple operation is described with reference to this operation flowchart.

Upon receiving information on the sheet size, the binding mode, and the like from the image forming apparatus main body B, the sheet processing apparatus C first executes an initial operation for executing the staple operation (ST1). In this initial operation, the presence of remained sheets, the positions of the stapler unit 41 or the gripper unit 40, the states of the shift roller 30 and the stopper member 31, and the like are detected. If there are sheets thus remained, error information is sent to the image forming apparatus main body B. If the stapler unit 41, the gripper unit 40, the shift roller 30, the stopper member 31, and the like are not located at the home positions or initial positions thereof, those units and the like are controlled to move to the home positions or the initial positions.

In this initial operation, a pre-staple process of moving the stapler unit 41 to a predetermined binding position in advance in response to the binding mode is executed. This pre-staple process is described with reference to an operation flowchart of FIG. 13. In the case of performing the pre-staple process, first, it is determined whether the binding mode is the end binding mode based on the binding mode information from the image forming apparatus main body B (ST20). In the case where the binding mode is the end binding mode (Y in ST20), it is next determined whether the end binding mode is a first end binding mode, that is, an end binding mode of binding the corner portions of the sheets, which are located in the depth side of the sheet processing apparatus C (ST21). In the case where the binding mode is the first end binding mode (Y in ST21), the staple motor SM is driven reversely (ST22).

In such a way, the stapler unit 41 located at the home position SHP moves in the arrow b direction (depth side direction of the apparatus) indicated by a dotted line of FIG. 3. When the stapler unit 41 has arrived at a first staple position of being tilted at approximately 45° (Y in ST23), the staple motor SM is stopped (ST24). In such a way, the stapler unit 41 moves to the first staple position and is positioned there before the sheets are delivered onto the processing tray 14.

In the case where the binding mode is a second end binding mode, that is, a mode of binding the corner portions of the sheets, which are located on the front side of the sheet processing apparatus (N in ST21), the gripper motor GM2 is driven reversely (ST25). The gripper unit 40 moves in the arrow d direction indicated by the dotted line of FIG. 3. If the gripper unit 40 has arrived at the rail connection position (delivery position, retreat region) P3 (Y in ST26), then the gripper motor GM2 is stopped (ST27). In such a way, the guide rail portion R in which the first guide rail 43*a* continues to the second guide rail 43*b* and the third guide rail 43*c* is formed, and the stapler unit 41 is movable in the width direction.

After the gripper unit 40 has arrived at the rail connection position (retreat region) P3, the staple motor SM is driven positively (ST28). The stapler unit 41 moves from the home position SHP in the arrow a direction (frontward of the apparatus) indicated by a solid line of FIG. 3. At this time, the gripper unit 40 located at the widthwise center portion of the base 42 moves to the retreat region indicated by the chain double-dashed line of FIG. 9 prior to the movement of the stapler unit 41 as described above. Therefore, the stapler unit 41 can smoothly move without receiving hindrance to the movement thereof. When the stapler unit 41 has arrived at a second staple position of being tilted at approximately 45° on the front side of the apparatus (Y in ST29), the staple motor SM is stopped (ST30). In such a way, the stapler unit 41 moves to the second staple position and is positioned there before the sheets are delivered onto the processing tray 14. When the stapler unit 41 is positioned at the staple position, the gripper motor GM2 is driven positively (ST31), and the gripper unit 40 is returned to the home position. When the gripper unit 40 has arrived at the home position (Y in ST32), the gripper motor GM2 is stopped (ST33).

The stapler unit 41 is moved to the staple position corresponding to the binding mode before the sheets arrive at the processing tray 14. In such a way, the binding process can be implemented for the sheet bundle immediately at the point of time when the sheet bundle is transported to the process position. In such a way, even in a miniaturized apparatus, it is easy to shorten a time period for the staple process.

When the initial operation is completed, as illustrated in FIG. 12, the transport roller (pair) 21 and the delivery roller (pair) 22 are driven (ST2), and the sheets are delivered onto the processing tray 14. After that, a sheet alignment process is executed (ST3). This sheet alignment process is described with reference to an operation flowchart of FIG. 14. In the case of performing the sheet alignment process, when each of the sheets is delivered onto the processing tray 14, the shift roller 30 is lowered (ST40), and is brought into contact with the upper surface of the sheet. Next, the shift roller 30 is rotationally driven (ST41), and the sheet is transported toward the stopper member 31. After that, the shift roller 30 is driven by a predetermined stopper thrust amount. When the shift roller 30 is driven by the stopper thrust amount (Y in ST 42), the sheet is thrust against the stopper member 31 that has moved to the alignment position. When the sheet is thrust against the stopper member 31, the rotation of the shift roller 30 is stopped (ST43). In such a way, a trailing end position of the sheet is aligned. The stopper thrust amount is equivalent to a sheet transport amount by the shift roller 30, which is preset in order to thrust the trailing end of the delivered sheet against the stopper member 31. Actually, a drive amount of a feed motor (not shown) that causes the shift roller 30 to rotate is measured by counting drive pulses thereof.

When the trailing end of the sheet is thrust against the stopper member 31 and is stopped, the shift roller 30 selects a slide direction thereof in response to the binding mode, and moves. In the case where the binding mode is the second end binding mode (Y in ST44), the shift roller 30 is slidingly moved frontward of the sheet processing apparatus (ST45). At this time, because an outer circumferential surface of the shift roller 30 is formed of the high friction member, the sheet with which the shift roller 30 is brought into contact is also slidingly transported toward the second thrust plate (alignment member) 32*b* located on the front side of the apparatus following the movement of the shift roller 30. When the shift roller 30 is moved by the thrust amount by which the end portion of the sheet is thrust against the second thrust plate 32*b* (Y in ST46), the slide operation of the shift roller 30 is stopped (ST47). After that, the shift roller 30 is lifted (ST48), and the shift roller 30 is slidingly moved toward the home position (inward of the apparatus) (ST49). When the shift roller 30 has arrived at the home position located at the widthwise center of the sheet (Y in ST55), the slide of the shift roller 30 is stopped (ST56).

In the case where the binding mode is other than the second end binding mode, that is, the first end binding mode or the two-spot binding mode (N in ST44), the shift roller 30 is slidingly moved inward of the apparatus (ST50). When the shift roller 30 is moved by a thrust amount by which the end portion of the sheet is thrust against the first thrust plate (alignment member) 32*a* (Y in ST51), the slide of the shift roller 30 is stopped (ST52). After that, the shift roller 30 is lifted (ST53), and the shift roller 30 is slidingly moved toward the home position (frontward of the apparatus) (ST54). When the shift roller 30 has arrived at the home position (Y in ST55), the slide of the shift roller 30 is stopped (ST56).

When the sheet alignment process is completed, it is determined whether or not the sheet aligned as illustrated in FIG. 12 is the last sheet of the sheet bundle based on sheet information from the image forming apparatus main body B (ST4). If the sheet is not the last sheet (N in ST4), the sheet processing apparatus is on standby until a subsequent sheet is delivered onto the processing tray, and, after the delivery of the subsequent sheet, repeats the sheet alignment process for the sheets one by one until the last sheet of the sheet bundle is aligned.

When the alignment process for all of the sheets is completed, that is, in the case where the aligned sheet is the last sheet of the sheet bundle (Y in ST4), a grip transport process for transporting (moving) the sheet bundle to the staple process position by the gripper unit 40 is executed (ST5). This grip transport process is described with reference to an operation flowchart of FIG. 15. In the case of performing the grip transport process, the grip motor GM1 is first driven positively (ST60). When the lever detection sensor GS1 is OFF, that is, when the lever detection sensor GS1 detects the passage of the detection flag 142*b* (Y in ST61), the grip motor GM1 is stopped at a point of time when the grip motor GM1 is driven by a predetermined amount (ST62). In such a way, as illustrated in FIG. 6B, the movable grip arm 44*b* separates from the fixed grip arm 44*a*, and the grip arm pair 44 turns to the opened state.

While the grip arm pair 44 is in the opened state, the gripper motor GM2 is driven reversely (ST63), and the gripper unit 40 is allowed to head for a sheet grip position of gripping the sheet bundle aligned in the sheet alignment process. When the gripper unit 40 has arrived at the sheet grip position (Y in ST64), the gripper motor GM2 is stopped (ST65). Next, the grip motor GM1 is driven reversely (ST66). When the lever detection sensor GS1 is ON, that is, when the lever detection sensor GS1 detects the detection flag 142*b* (Y in ST67), the drive lever 142 is rotated by a predetermined amount. When the drive lever 142 has been rotated by the predetermined amount (Y in ST68), the grip motor GM1 is stopped at that point of time (ST69). In such a way, the movable grip arm 44*b* is urged to the fixed grip arm 44*a* side by the action of the coil spring 144, and as illustrated in FIG. 6A, the gripper unit 40 turns to a state of gripping the sheet bundle so that the sheet bundle is gripped.

Next, the stopper member 31 is moved to the retreat position (ST70). In such a way, the gripper unit 40 is movable to the staple process position GHP in the state of gripping the sheet bundle. Next, the gripper motor GM2 is driven positively (ST71), and the gripper unit 40 is moved in the arrow c direction indicated by the solid line of FIG. 3 in the state of gripping the sheet bundle. After that, when the gripper unit 40 gripping the sheet bundle has arrived at the staple process position GHP (Y in ST72), the gripper motor GM2 is stopped (ST73), and the gripper unit 40 is positioned at the staple process position GHP.

Next, the grip motor GM1 is driven positively (ST74). When the lever detection sensor GS1 is turned OFF (Y in ST75), the grip motor GM1 is driven by a predetermined amount, and is then stopped (ST76). In such a way, the drive lever 142 rotates to the position of separating from the abutting portion 44*e* of the movable grip arm 44*b*, and the grip arm pair 44 turns to the opened state so that the grip for the sheet bundle is released.

When the grip transport process is completed, as illustrated in FIG. 12, the staple process for a predetermined position of the sheet bundle is executed (ST6). This staple process is described with reference to an operation flowchart of FIG. 16. In the case of performing the staple process, it is first determined whether or not the binding mode is the end binding mode (ST80). If the binding mode is the end binding mode at this time (Y in ST80), in the pre-staple process (initial operation) of Step 1 (ST1), the stapler unit 41 has already moved to any one of the first staple position and the second staple position in response to the binding mode. The stapler unit 41 is operated in this state (ST81), and the sheet bundle is stapled.

In the case where the binding mode is not the end binding mode but the two-spot binding mode (N in ST80), first, a unit connection process for connecting the gripper unit 40 and the stapler unit 41 to each other is executed (ST83). In such a way, the gripper unit 40 is also movable in the width direction in synchronization with the movement of the stapler unit 41. After that, in order to perform the two-spot binding process, the staple motor SM is driven positively (ST84). When the stapler unit 41 has arrived at a staple position as a first spot (Y in ST85), the staple motor SM is stopped (ST86), and the staple operation is performed.

When the staple operation for the first spot is executed, the staple motor SM is driven positively one more time (ST87), and the stapler unit 41 is moved to a staple position as a second spot. When the stapler unit 41 has arrived at the staple position as the second spot (Y in ST88), the staple motor SM is stopped (ST89). After that, the stapler unit 41 is operated (ST90), and the staple operation for the second spot is performed. When the staple processes for the two spots of the sheet bundle are completed by the stapler unit 41, a unit disconnection process for disconnecting the gripper unit 40 and the stapler unit 41 from each other is executed (ST91). Such a first staple position and such a second staple position are positions preset in response to the sheet size. A value stored in advance is set in response to the sheet size information from the image forming apparatus main body B, and the stapler unit 41 is controlled based on this value.

Figure 17:
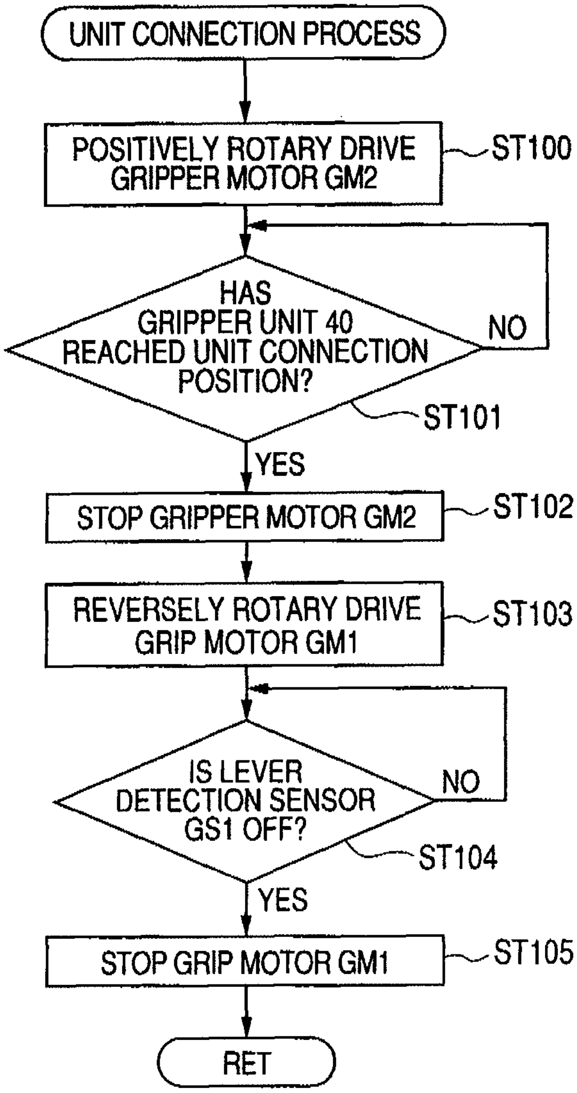
FIG. 17 is an operation flowchart illustrating a unit connection process of the sheet processing apparatus.
Figure 18:
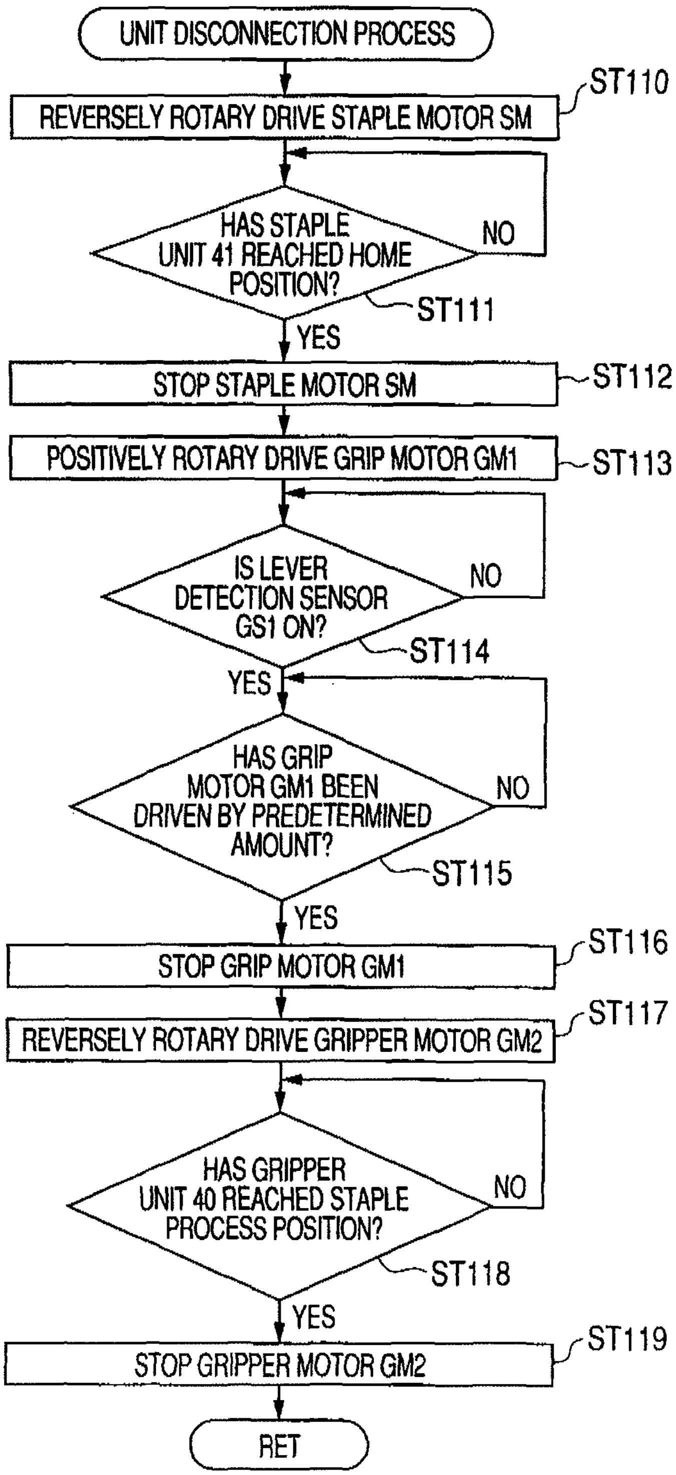
FIG. 18 is an operation flowchart illustrating a unit disconnection process of the sheet processing apparatus.
Figure 19:
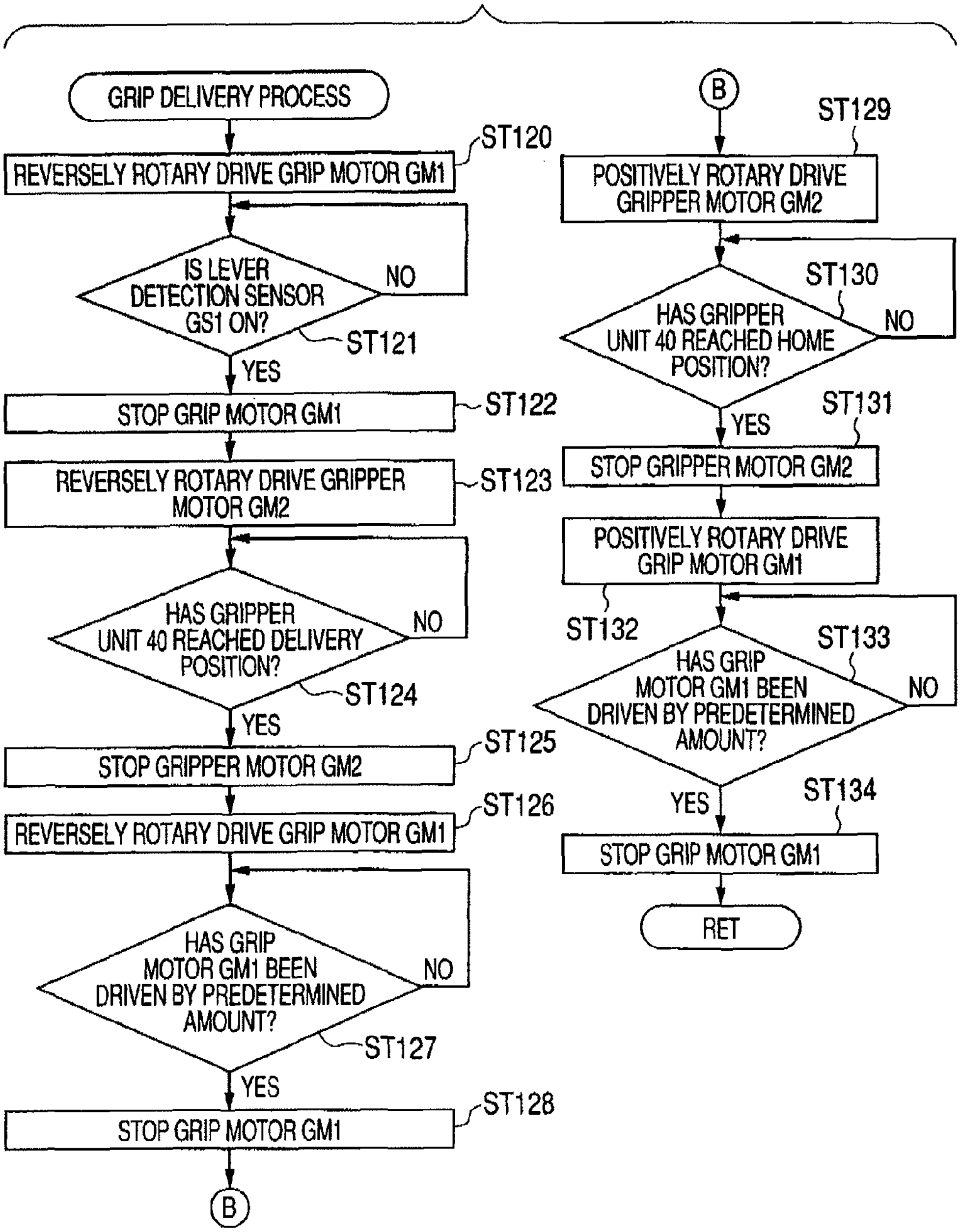
FIG. 19 is an operation flowchart illustrating a grip delivery process of the sheet processing apparatus.
Figure 20:
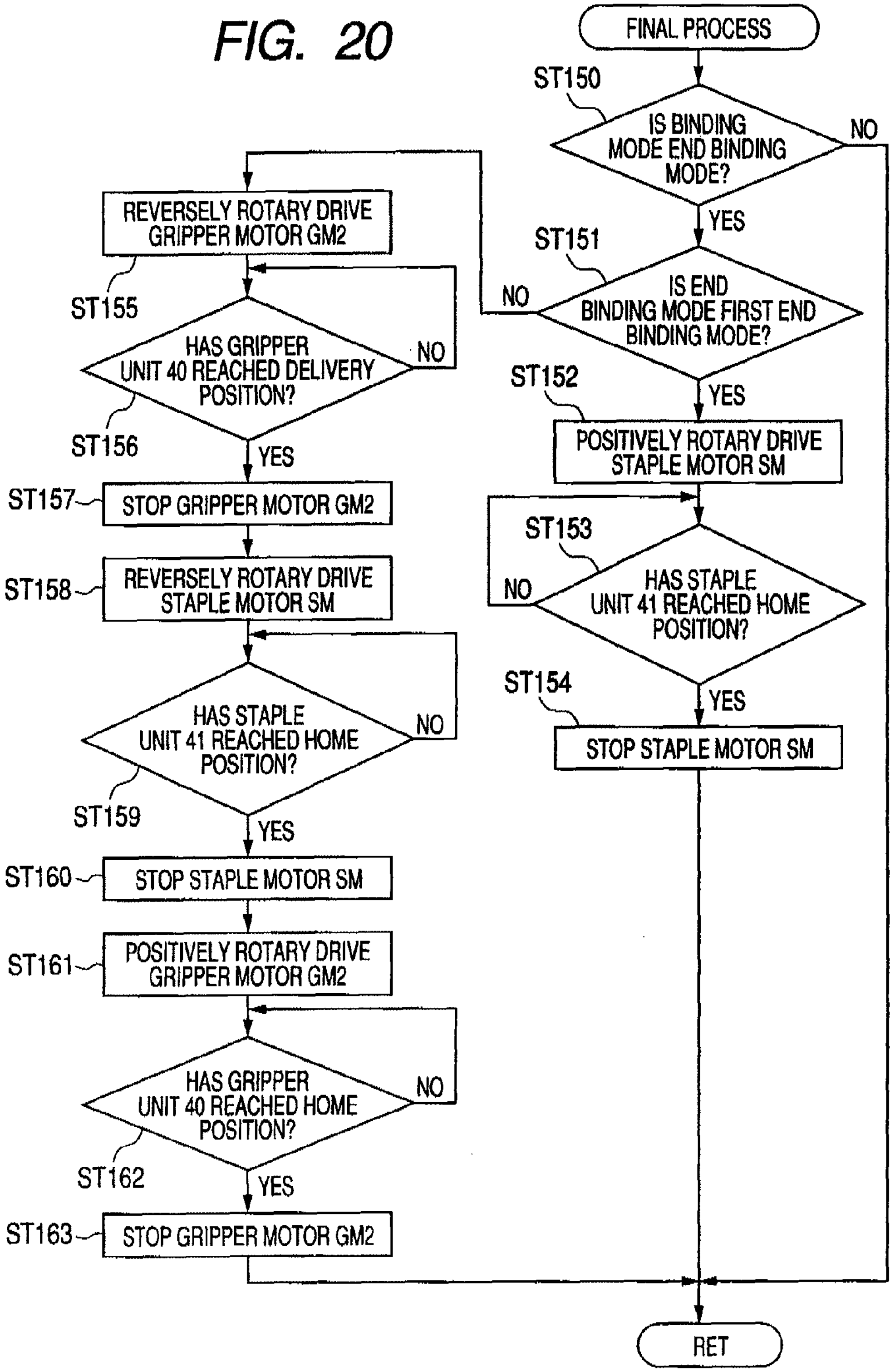
FIG. 20 is an operation flowchart illustrating a final process of the sheet processing apparatus.

The unit connection process and the unit disconnection process are described with reference to operation flowcharts of FIG. 17 and FIG. 18. In the case of performing the unit connection process, as illustrated in the operation flowchart of FIG. 17, the gripper motor GM2 is first driven positively (ST100), and the gripper unit 40 located at the staple process position GHP is moved toward the unit connection position P2. When the gripper unit 40 moves to the unit connection position P2 (Y in ST101), as illustrated in FIG. 10B and FIG. 11B, the protrusions 133 of the connection member 91 enter the groove portion (not shown) formed on the lower surface side of the engagement member 129. In such a way, the stapler unit 41 and the gripper unit 40 are connected to each other in the width direction, and are movable integrally with each other in the width direction. The tip end of the swing lever 162 of the gripper unit 40 abuts against the engagement member 129 on the stapler unit 41 side. As illustrated in FIG. 11B, the gripper unit 40 and the fourth guide rail 43*d* are separated from each other, and the gripper unit 40 is movable in the width direction.

After the stapler unit 41 and the gripper unit 40 are connected to each other in the width direction, the gripper motor GM2 is stopped (ST102), and the gripper unit 40 is stopped at the unit connection position P2. After that, the grip motor GM1 is driven reversely (ST103), and the operation member 131 and the detection flag 142*b* are rotated about the shaft 142*a* taken as the fulcrum. When the detection flag 142*b* passes through the lever detection sensor GS1, and the lever detection sensor GS1 is turned OFF (Y in ST104), the grip motor GM1 is stopped (ST105). At this time, the operation member 131 causes the operation pin 132*b* to move, and as illustrated in FIG. 10B, the engagement pin 132*a* of the connection arm member 132 engages with the groove portion 129*a* of the engagement member 129. In such a way, both of the units are connected to each other in the sheet delivery direction, and are movable integrally with each other along the sheet delivery direction.

The unit disconnection process is described. In the case of performing the unit disconnection process, as illustrated in the operation flowchart of FIG. 18, the staple motor SM is driven reversely when the staple process for the second spot is performed for the sheet bundle by the stapler unit 41 (ST110). In such a way, the stapler unit 41 is allowed to head for the home position SHP. When the stapler unit 41 has arrived at the home position SHP (Y in ST111), the staple motor SM is stopped (ST112). In such a way, the gripper unit 40 connected to the stapler unit 41 also moves, and the gripper unit 40 is positioned at the position of being connectable to the fourth guide rail 43*d*.

Next, the grip motor GM1 is driven positively (ST113). When the detection flag 142*b* passes through the lever detection sensor GS1, and the lever detection sensor GS1 is turned ON (Y in ST114), the grip motor GM1 is driven by a predetermined amount from this point of time. When the grip motor GM1 has been driven by the predetermined amount (Y in ST115), the grip motor GM1 is stopped (ST116). In such a way, the operation member 131 causes the operation pin 132*b* to move in the direction reverse to the direction at the time of the previous connection operation, and as illustrated in FIG. 10A, the engagement pin 132*a* of the connection arm member 132 is retreated from the groove portion 129*a* of the engagement member 129. In such a way, the gripper unit 40 and the stapler unit 41 are disconnected from each other.

After that, the gripper motor GM2 is driven reversely (ST117), and the gripper unit 40 is allowed to head for the staple process position. When the gripper unit 40 returns to the staple process position one more time (Y in ST118), the gripper motor GM2 is stopped (ST119). At the point of time when the reverse drive of the gripper motor GM2 is started, the gripper motor GM2 and the gripper unit 40 are not surely connected to each other. However, the slide pins 145 of the gripper unit 40 engage with the groove portion of the fourth guide rail 43*d*. Therefore, the gripper unit 40 moves following the movement of the fourth guide rail 43*d*. In a process of this movement, the tip end of the swing lever 162 of the gripper unit 40 is spaced apart from the engagement member 129 on the stapler unit 41 side, and as illustrated in FIG. 11A, the gripper unit 40 and the fourth guide rail 43*d* are surely connected to each other.

When the staple process is completed, as illustrated in FIG. 12, a grip delivery process for delivering the sheet bundle to the stack tray 51 is executed (ST7). This grip delivery process is described with reference to an operation flowchart of FIG. 19. In the case of performing the grip delivery process, the grip motor GM1 of the gripper unit 40 located at the staple process position is first driven reversely (ST120). When the lever detection sensor is turned ON (Y in ST121), the grip motor GM1 is stopped (ST122). In such a way, the sheet bundle is gripped by the grip arm pair 44.

Next, when the grip arm pair 44 grips the sheet bundle, the gripper motor GM2 is driven reversely (ST123). In such a way, the gripper unit 40 moves toward the storing section 10. When the gripper unit 40 has arrived at the delivery position P3 illustrated in FIG. 3 (Y in ST124), the gripper motor GM2 is stopped (ST125). Next, the gripper motor GM1 is driven reversely in such a state that the gripper unit 40 has arrived at the delivery position (ST126). In such a way, the first gripper unit 40*a* moves to the stack tray 50 side. After that, when the grip motor GM1 is driven reversely by a predetermined amount (Y in ST127), the grip motor GM1 is stopped (ST128).

Figure 21A:
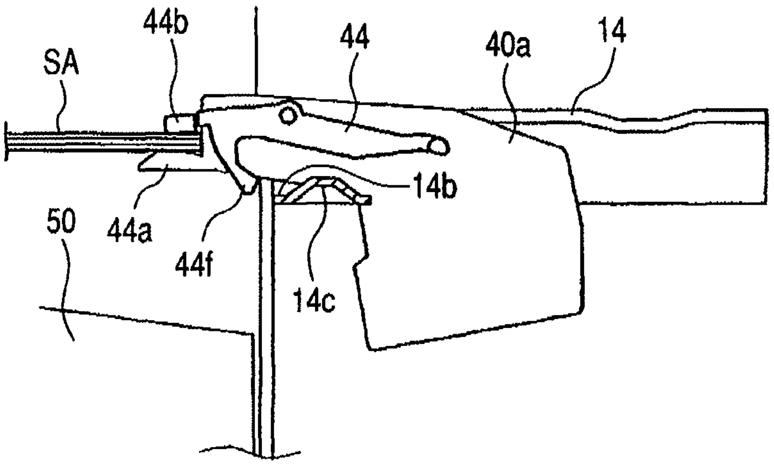
FIGS. 21A and 21B illustrate sheet bundle storing operations of the sheet processing apparatus.

In this embodiment, a notched portion (not shown) extended in the sheet delivery direction is provided in the processing tray 14. By the notched portion, the grip portions 44*c* and 44*d* of the grip arm pair 44 move from above the processing tray 14 to a position, which is above the stack tray 50 and below a placing end surface of the processing tray 14, as illustrated in FIG. 21A. In such a way, the sheet bundle SA moves onto the stack tray 50.

Figure 21B:
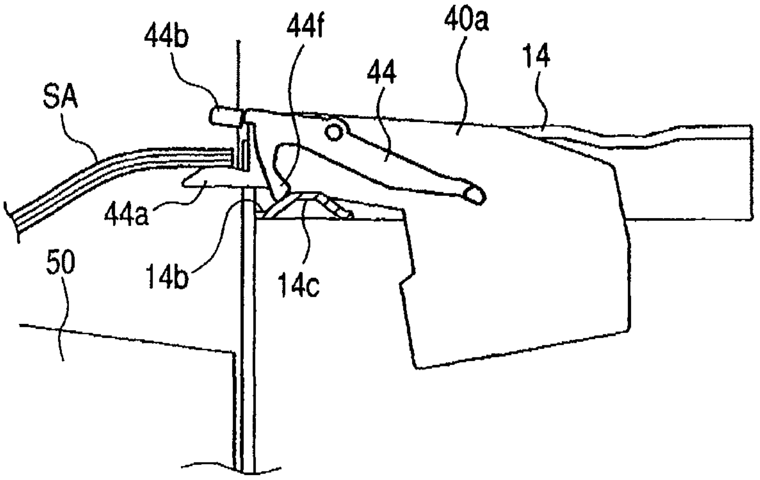

When the first gripper unit 40*a* transports the sheet bundle SA onto the stack tray, the gripper motor GM2 is driven positively (ST129), and the first gripper unit 40*a* is moved in a direction different from the stack tray side, that is, toward the home position. When the first gripper unit 40*a* is moved, a protrusion 44*f* of the grip arm pair 44 is thrust against a guide piece 14*c* provided on a bent portion 14*b* bent from the notched portion of the processing tray 14. In such a way, as illustrated in FIG. 21B, the movable grip arm 44*b* moves in the separating direction from the fixed grip arm 44*a*, and releases the grip for the sheet bundle SA. As a result, the sheet bundle is stored on the stack tray 50.

After that, when the gripper unit 40 has arrived at the home position (Y in ST130), the gripper motor GM2 is stopped (ST131). Next, the grip motor GM1 is driven positively (ST132), and the grip motor GM1 is driven by a predetermined amount so as to return the first gripper unit 40*a* to a predetermined position. In such a way, the grip arm pair 44 of the first gripper unit 40*a* moves to above the placing surface of the processing tray 14. When the grip motor GM1 is driven by a predetermined amount (Y in ST133), the grip motor GM1 is stopped (ST134).

When the grip delivery process for the sheet bundle is completed, as illustrated in FIG. 12, it is determined whether a set number of copies has been processed, which is received from the image forming apparatus main body B (ST8). If the set number of copies has not been processed (N in ST8), ST3 to ST8 of FIG. 12 are executed repeatedly. If the set number of copies has been processed (Y in ST8), a final process for stopping the sheet processing apparatus C is executed (ST9). This final process is described with reference to an operation flowchart of FIG. 20.

In this final process, operations of returning the transport roller 21, the delivery roller 22, the stopper member 31, and the like to initial states thereof are executed. In the case where the binding mode is the end binding mode, the process for moving the stapler unit 41 from the staple position to the home position is executed.

In the case where the binding mode is the end binding mode (Y in ST150), it is next determined whether the end binding mode is the first end binding mode (ST151). In the case where the binding mode is the first end binding mode (Y in ST151), the staple motor SM is driven positively (ST152). In such a way, the stapler unit 41 moves toward the home position. When the stapler unit 41 has arrived at the home position (Y in ST153), the staple motor SM is stopped (ST154).

In the case where the binding mode is the second end binding mode (N in ST151), the gripper motor GM2 is driven reversely (ST155). In such a way, the gripper unit 40 heads for the delivery position (retreat region) P2. When the gripper unit 40 has arrived at the delivery position (Y in ST156), the gripper motor GM2 is stopped (ST157). In such a way, the guide rail portion R is formed, in which the first guide rail 43*a*, the second guide rail 43*b* and third guide rail 43*c* are continued. Next, the staple motor SM is driven reversely (ST158), and the staple unit 41 is allowed to head for the home position. When the stapler unit 41 has arrived at the home position (Y in ST159), the staple motor SM is stopped (ST160). After that, the gripper motor GM2 is driven positively (ST161), and the gripper unit 40 is allowed to head for the home position. When the gripper unit 40 has arrived at the home position (Y in ST162), the gripper motor GM2 is stopped (ST163). When the final process is ended, the staple operation of the sheet processing apparatus C is ended.

In this embodiment, the detection as to whether the gripper unit 40 has arrived at the respective stop positions, which are the staple process position (home position), the grip position, the delivery position, and the connection position, is performed by detection sensors provided at the respective stop positions. It may also be detected that the gripper unit 40 has arrived at each of the stop positions in such a manner that the number of drive pulses of the gripper motor GM2, which is equivalent to a distance to each of the stop positions, is stored, and that the number of drive pulses of the gripper motor GM2 is counted.

The movement of the stapler unit 41 to the first and second staple positions and the movement of the stapler unit 41 to the home position in the first and second end binding modes are also detected by detection sensors arranged at those respective positions. In the movement control to the first staple position and the second staple position in the two-spot binding mode, movement amounts of the stapler unit 41 are calculated in response to the sheet size. The number of drive pulses, which is set based on a result of this calculation, is counted. The stapler unit 41 just needs to be stopped at the first and second staple positions based on the counted number of drive pulses.

As described above, in this embodiment, the stapler unit 41 is moved to any one of the first and second binding positions by the operations of the above-mentioned first and second moving mechanisms performed based on the control of the control unit G. Prior to this movement, the gripper unit 40 can be moved to the retreat region along the long grooves 42*a*, and the stapler unit 41 can be moved through the guide rail portion R while passing above the long grooves 42*a* (above the guide grooves).

Accordingly, at the time when the gripper unit 40 moves, the first guide rail 43*a* moves together with the gripper unit 40. Therefore, the movement of the gripper unit itself is not prohibited. At the time when the stapler unit 41 moves, the long grooves 42*a* do not prohibit the movement of the stapler unit 41. In such a way, the movement of both of the gripper unit 40 and the stapler unit 41 is smoothly performed in a state of not being prohibited by the long grooves 42*a* and the guide rail portion R. Therefore, even in the miniaturized apparatus, the time period required for the binding process can be shortened, and the apparatus is not enlarged in scale though the retreat region for the gripper unit 40 is provided. Further, a structure of the apparatus can be simplified though the intersecting moving routes for the stapler unit 41 and the gripper unit 40 are provided, and a configuration that does not prohibit the quick movement of both of the units can be realized.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Applications. No. 2009-211125, filed Sep. 11, 2009 and No 2010-161370, filed Jul. 16, 2010, which are hereby incorporated by reference herein in their entirety.

What is claimed is:

1. A sheet processing apparatus, comprising:

a processing tray on which sheets transported in a predetermined delivery direction are accumulated;

a binding device configured to bind one side on an upstream side in the delivery direction of the sheets accumulated on the processing tray;

a gripping device configured to grip the one side of the sheets bound by the binding device;

a first moving mechanism configured to move the binding device in a direction intersecting the delivery direction along the one side of the sheets accumulated on the processing tray;

a second moving mechanism configured to move the sheets in the delivery direction by moving the gripping device in the delivery direction at a time of delivering the sheets; and a control unit configured to control the binding device by the first moving mechanism and control the gripping device by the second moving mechanism, wherein, in a case that the binding device is moved by the first moving mechanism to an opposite side of the gripping device in a direction along the one side, the control unit causes the second moving mechanism to move the gripping device to a retreat position at which the gripping device is prevented from prohibiting movement of the binding device, before a first sheet of a sheet bundle to be stacked is transported to the processing tray, and the control unit causes the second moving mechanism to move the gripping device to a region at which the binding devices moves, after the binding device is moved to the opposite side of the gripping device.

2. A sheet processing apparatus according to claim 1, further comprising:

a first guide portion configured to guide the gripping device; and a second guide portion configured to guide the binding device, wherein the second guide portion comprises:

a pair of end-side guide rails arranged at a predetermined interval along the direction intersecting the delivery direction; and a center guide rail that is fixed to the gripping device along the direction intersecting the delivery direction, and is arrayed in line with the pair of end-side guide rails by being located between the pair of end-side guide rails when the gripping device is moved to the retreat position, and wherein the control unit causes the second moving mechanism to move the gripping device to the retreat position before moving the binding device by the first moving mechanism to the opposite side of the gripping device, and then, the control unit causes the first moving mechanism to move the binding device through the pair of end-side guide rails and the center guide rail.

3. An image forming apparatus, comprising:

an image forming section configured to form an image on a sheet; and a sheet processing apparatus configured to process the sheet on which the image is formed by the image forming section, wherein the sheet processing apparatus is the sheet processing apparatus according to claim 1.

* * * * *